US011568693B2

(12) United States Patent
Grzenda et al.

(10) Patent No.: US 11,568,693 B2
(45) Date of Patent: Jan. 31, 2023

(54) SYSTEMS, DEVICES, AND METHODS FOR CONTROLLING ACCESS TO A SECURE SPACE

(71) Applicant: Konnex Enterprises Inc., Ancaster (CA)

(72) Inventors: Jeanne Grzenda, Ancaster (CA); Timothy Kyowski, Kitchener (CA); Sean B. Simmons, Waterloo (CA)

(73) Assignee: Konnex Enterprises Inc., Ancaster (CA)

( * ) Notice: Subject to any disclaimer, the term of this patent is extended or adjusted under 35 U.S.C. 154(b) by 0 days.

(21) Appl. No.: 17/385,392

(22) Filed: Jul. 26, 2021

(65) Prior Publication Data

US 2022/0028194 A1 Jan. 27, 2022

Related U.S. Application Data

(60) Provisional application No. 63/056,539, filed on Jul. 24, 2020.

(51) Int. Cl.
*G07C 9/00* (2020.01)
*G06F 21/44* (2013.01)

(52) U.S. Cl.
CPC ......... *G07C 9/00571* (2013.01); *G06F 21/44* (2013.01); *G07C 9/00309* (2013.01); *G07C 9/00944* (2013.01); *G07C 2009/00317* (2013.01); *G07C 2009/00634* (2013.01); *G07C 2209/62* (2013.01)

(58) Field of Classification Search
CPC ............ G07C 9/00571; G07C 9/00309; G07C 9/00944; G07C 2009/00317
See application file for complete search history.

(56) References Cited

U.S. PATENT DOCUMENTS 8,789,859 B2  7/2014  Curtis et al.
9,365,188 B1 *  6/2016  Penilla ............... G06Q 30/0643
(Continued)

FOREIGN PATENT DOCUMENTS

CA      2658729 A1    9/2009
CA      2828270 A1    9/2012
(Continued)

*Primary Examiner* — Nabil H Syed
(74) *Attorney, Agent, or Firm* — Bereskin & Parr LLP

(57) ABSTRACT

Systems, devices, and methods for controlling access to a secure space are disclosed. The system includes a locking device fastenable to an access point of the secure space, a server, and a network for communication between the locking device and server. The server includes a storage unit to store authorization data for the locking device and the user computing device, and a processing unit for receiving a request from the user computing device to access the locking device; authenticating the user computing device; generating authorization data; and providing at least part of the authorization data to each of the locking device and the user computing device. The locking device includes an actuator, a memory, and a processing unit for receiving a security command from the user computing device; determining whether the security command includes requesting data that corresponds to the authorization data; and generating a control signal for the actuator to move the locking device based on the security command.

20 Claims, 18 Drawing Sheets

(56) References Cited

U.S. PATENT DOCUMENTS

| | | |
|---|---|---|
| 9,646,165 B1 | 5/2017 | Saylor |
| 9,679,429 B2 | 6/2017 | Duncan et al. |
| 9,728,022 B2 | 8/2017 | Gengler et al. |
| 9,747,739 B2 | 8/2017 | Gengler et al. |
| 9,810,000 B2 | 11/2017 | Schroeder |
| 9,860,677 B1 | 1/2018 | Agerstam et al. |
| 11,145,016 B1* | 10/2021 | Brophy .............. G06Q 30/0645 |
| 2003/0208386 A1* | 11/2003 | Brondrup ............... G06Q 10/02 |
| | | 705/5 |
| 2012/0011902 A1 | 1/2012 | Meekma |
| 2013/0086956 A1 | 4/2013 | Nave |
| 2016/0217637 A1 | 7/2016 | Gengler et al. |
| 2016/0292943 A1* | 10/2016 | Ranchod ............. E05B 37/0068 |
| 2016/0307380 A1 | 10/2016 | Ho et al. |
| 2017/0063566 A1 | 3/2017 | Seminario et al. |
| 2017/0076520 A1 | 3/2017 | Ho |
| 2017/0154483 A1 | 6/2017 | Cordiner et al. |
| 2017/0236343 A1* | 8/2017 | Leboeuf .................... H04L 9/30 |
| | | 340/5.61 |
| 2017/0067271 A1 | 11/2017 | Schroeder |
| 2018/0018841 A1 | 1/2018 | Gengler et al. |
| 2018/0018843 A1 | 1/2018 | Gengler et al. |
| 2018/0023322 A1 | 1/2018 | Curtis et al. |
| 2018/0075679 A1* | 3/2018 | Niroomand ........ G07C 9/00944 |
| 2020/0410795 A1* | 12/2020 | Peng .................... H04L 9/0822 |

FOREIGN PATENT DOCUMENTS

| | | |
|---|---|---|
| CN | 105590361 A | 5/2016 |
| EP | 243461 A1 | 11/1987 |
| WO | 2012034171 A1 | 3/2012 |
| WO | 2016131416 A1 | 8/2016 |
| WO | 2017044599 A1 | 3/2017 |

* cited by examiner

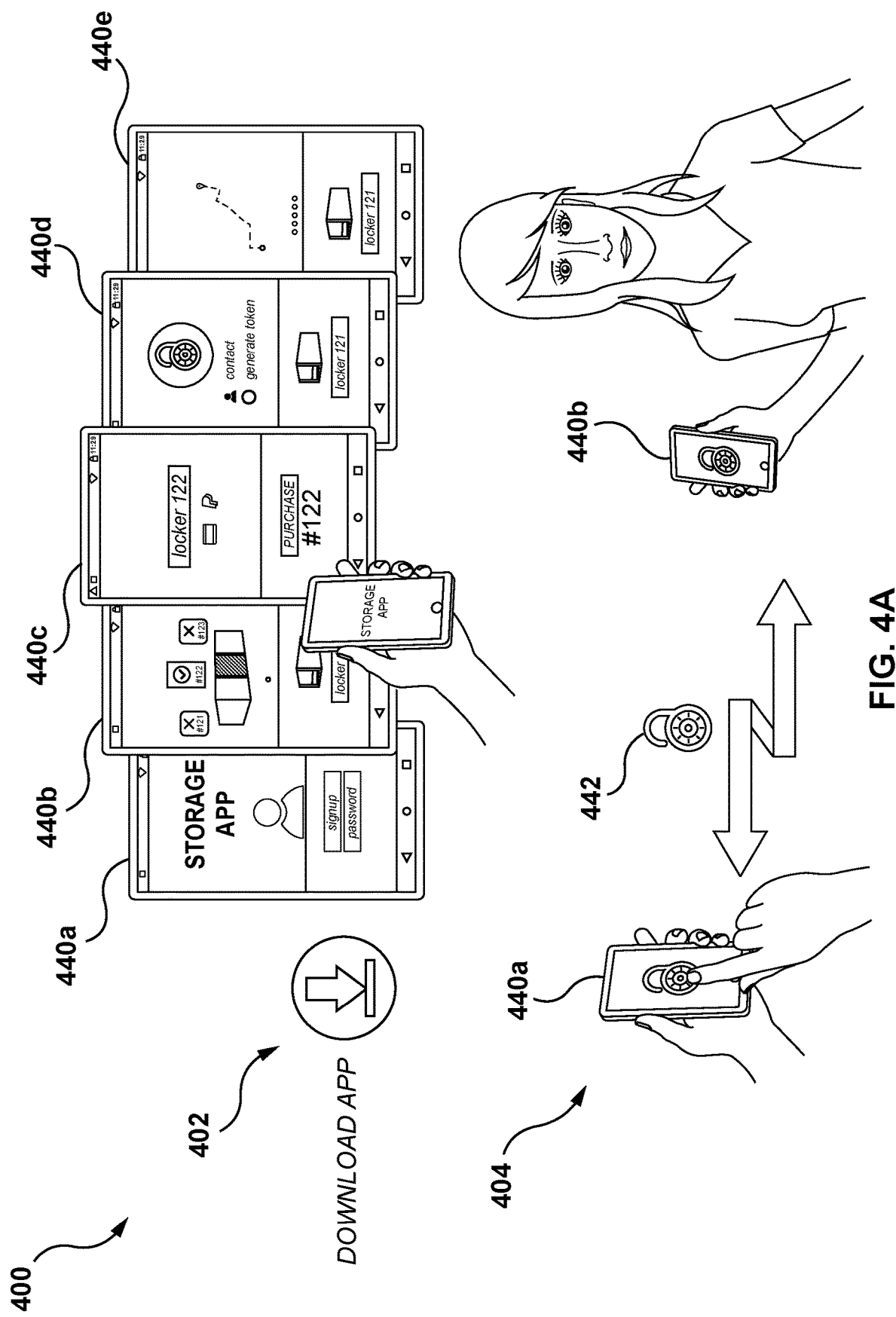

In series, two switches

Two circuits, two switches

One circuit, one switch

SYSTEMS, DEVICES, AND METHODS FOR CONTROLLING ACCESS TO A SECURE SPACE

CROSS-REFERENCE TO RELATED APPLICATIONS

The present application claims the benefit of U.S. Provisional Patent Application No. 63/056,539 entitled SYSTEMS, DEVICES, AND METHODS FOR CONTROLLING ACCESS TO A SECURE SPACE, filed Jul. 24, 2020, the entirety of which is incorporated herein by reference.

FIELD

The described embodiments relate to physical security and in particular, to systems, devices and methods of providing controlling access to a secure space.

BACKGROUND

Self-storage facilities rent space to tenants for storage of goods. Tenants may be individuals who would like to store household goods. Tenants may also be businesses who require space to store inventory, tools, parts, supplies, or records. Furthermore, some self-storage facilities offer climate controlled environments, which allow businesses to readily store sensitive goods (i.e., pharmaceuticals and electronics) without the overhead expenses involved in establishing and maintaining such a climate controlled environment.

Self-storage units can be secured by a locking device. The locking device can be provided by the tenant and personnel of the facility may not have access to the self-storage unit. In other cases, the locking device can be provided by the facility and the facility can have a master key to unlock the locking device if needed. Locking devices can be locked and/or unlocked with physical keys including traditional physical keys, key fobs, and key cards, digital keys including passwords and key codes, or biometric data. The facility can also have additional security measures such as locked doors and gateways for areas within and around the facility to ensure that only authorized personnel have access to those areas of the facility.

SUMMARY

The various embodiments described herein generally relate to methods (and associated systems and devices configured to implement the methods) for controlling access to a secure space.

In a broad aspect, a system for controlling access to a secure space is disclosed. The system includes at least one communication network; a locking device fastenable to an access point of the secure space, the locking device comprising an actuator, a lock processor, a lock memory, and at least one lock communication interface, the actuator for moving the locking device into a locked state to maintain the access point closed or an unlocked state to allow the access point to be opened, the lock processor operable to generate a control signal for the actuator, the at least one lock communication interface being operable to communicate via the at least one communication network; and a server comprising: a server storage unit to store authorization data for the locking device; at least one server communication interface operable to communicate with the locking device and at least one user computing device via the at least one communication network; and a server processing unit operable to: receive, from a user computing device of the at least one user computing device, a request to access the locking device; authenticate the user computing device; generate authorization data for the locking device and the user computing device; and provide at least part of the authorization data to each of the locking device and the user computing device; wherein the lock processor is operable to: store the authorization data from the server in the lock memory; receive a security command from the at least one user computing device; determine whether the security command includes requesting data that corresponds to the authorization data stored in the lock memory; and in response to determining that the requesting data corresponds to the authorization data stored in the lock memory; generate a control signal for the actuator to move the locking device into the locked state when the locking device transitions from open to closed, otherwise generate a control signal for the actuator based at least in part on the security command.

In some aspects, the security command can include either an unlock command or a lock command; upon receipt of an unlock command, the control signal generated by the lock processor can include a signal to move the locking device into the unlocked state; and upon receipt of a lock command, the control signal generated by the lock processor can include a signal to move the locking device into the locked state.

In some aspects, the authorization data can include a public key of a public/private key pair of the locking device, the private key pair of the locking device being stored in the lock memory.

In some aspects, the authorization data can include a public key of a public/private key pair of the user computing device, the private key pair of the user computing device being stored in memory of the user computing device.

In some aspects, the authorization data provided to the locking device and the user computing device can include a digital access key, the digital access key including a pre-determined usage limit; and the lock processor can be operable to determine whether the digital access key is valid based on the pre-determined usage limit.

In some aspects, the digital access key can include at least one of a pre-determined expiration date or a pre-determined expiration period and the lock processor can be operable to determine whether the digital access key is valid based on at least one of the pre-determined expiration date and the pre-determined expiration period.

In some aspects, the authorization data can include a digital access key including at least one of a generation date or a pre-determined start date; and the lock processor can be operable to determine whether the a digital access key is valid based on at least one the generation date or the pre-determined start date.

In some aspects, the authorization data can include a digital access key signed using a certificate; and the lock processor can be operable to determine whether the digital access key is valid based on the certificate used to sign the digital access key.

In some aspects, the certificate can be generated by a certificate authority of a plurality of sequential certificate authorities.

In some aspects, the server processing unit operable to authenticate the user computing device can involve generating an invitation token having a pre-determined expiration period, sending the invitation token to the user computing device, and receiving the invitation token within the pre-determined expiration period.

In a broad aspect, a method for controlling access to a secure space is disclosed. The method includes providing at least one communication network and a server, the server comprising a server processing unit, a server storage unit, and at least one communication interface operable to communicate with at least one user computing device via the at least one communication network; fastening a locking device to an access point of the secure space, the locking device comprising an actuator, a lock processor, a lock memory, and at least one lock communication interface, the actuator for moving the locking device into a locked state to maintain the access point closed or an unlocked state to allow the access point to be opened, the at least one lock communication interface being operable to communicate with the server via the at least one communication network; storing authorization data for the locking device on the server storage unit; configuring the server processing unit to: receive, from a user computing device of the at least one user computing device, a request to access the locking device; authenticate the user computing device; generate authorization data for the locking device and the user computing device; and provide at least part of the authorization data to each of the locking device and the user computing device; and configuring the lock processor to: store the authorization data from the server in the lock memory; receive a security command from the at least one user computing device; determine whether the security command includes requesting data that corresponds to the authorization data stored in the lock memory; and in response to determining that the requesting data corresponds to the authorization data stored in the lock memory; generate a control signal for the actuator to move the locking device into the locked state when the locking device transitions from open to closed, otherwise generate a control signal for the actuator based at least in part on the security command.

In some aspects of the method, the security command can include either an unlock command or a lock command; and configuring the lock processor can involve configuring the lock processor to: generate a signal to move the locking device into the unlocked state upon receipt of an unlock command; and generate a signal to move the locking device into the locked state upon receipt of a lock command.

In some aspects of the method, the authorization data can include a public key of a public/private key pair of the locking device, the private key pair of the locking device being stored in the lock memory.

In some aspects of the method, the authorization data can include a public key of a public/private key pair of the user computing device, the private key pair of the user computing device being stored in memory of the user computing device.

In some aspects of the method, the authorization data provided to the locking device and the user computing device can include a digital access key, the digital access key including a pre-determined usage limit; and the lock processor can be operable to determine whether the digital access key is valid based on the pre-determined usage limit.

In some aspects of the method, the digital access key can include at least one of a pre-determined expiration date or a pre-determined expiration period, the lock processor can be operable to determine whether the digital access key is valid based on at least one of the pre-determined expiration date and the pre-determined expiration period.

In some aspects of the method, the authorization data can include a digital access key including at least one of a generation date or a pre-determined start date; and configuring the lock processor can involve configuring the lock processor to determine whether the a digital access key is valid based on at least one the generation date or the pre-determined start date.

In some aspects of the method, the authorization data can include a digital access key signed using a certificate; and configuring the lock processor can involve configuring the lock processor to determine whether the digital access key is valid based on the certificate used to sign the digital access key.

In some aspects of the method, the certificate can be generated by a certificate authority of a plurality of sequential certificate authorities.

In some aspects of the method, configuring the server processing unit to authenticate the user computing device can involve configuring the server processing unit to generate an invitation token having a pre-determined expiration period, send the invitation token to the user computing device, and receive the invitation token within the pre-determined expiration period.

In a broad aspect, a locking device is disclosed. The locking device includes a body including: a rotatable locking cam having a locked paddle and an unlocked paddle, the rotatable locking cam being rotatable between a locked position and an unlocked position; a locking pin; and a power supply for supplying electrical power to circuit components of the locking device; and a shackle having two arms insertable into the body, one of the two arms having a groove in a bottom portion thereof configured to engage with the locking pin when the rotatable locking cam is in the locked position and the shackle is in a closed position; wherein the locking device is configured to detect a position of one or more of the rotatable locking cam, the locking pin and the shackle.

In a broad aspect, a locking device is disclosed. The locking device includes a body including a rotatable locking cam having a locked paddle and an unlocked paddle, the cam being rotatable between a first position and a second position; a locking pin; and a power supply for supplying electrical power to circuit components of the locking device; and a shackle having two arms insertable into the body, one of the two arms having a groove in a bottom portion thereof configured to engage with the locking pin when the shackle is in a closed position; wherein in the first position, the locked paddle of the rotatable locking cam engages the locking pin to retain the locking pin in the groove and in the second position the locked paddle of the rotatable locking cam is disengaged from the locking pin.

In some aspects, the locking pin is configured to fall out of the groove of the shackle when the rotatable locking upon the shackle moving upwardly relative to the locking pin.

In some aspects, the body includes one or more switches configured to indicate if the shackle is in an open or a closed position.

In some aspects, the body includes two switches, one positioned at either end of the shackle to indicate if the shackle is in an open or a closed position.

In some aspects, the switches are two stage switches.

In some aspects, the body further includes a spring ball plunger and the shackle further includes a raceway, the spring ball plunger being configured to rest within the raceway to provide for the shackle to be removed from the body.

In some aspects, each of the unlocked paddle and the locked paddle extend from the rotatable locking cam towards a same arm of the shackle.

In some aspects, the locked paddle is positioned vertically above the unlocked paddle.

In some aspects, the rotatable locking cam is configured to rotate in a first direction to move the locking device from a locked state to an unlocked state and a second direction to move the locking device from an unlocked state to a locked state.

BRIEF DESCRIPTION OF THE DRAWINGS

Several embodiments will now be described in detail with reference to the drawings, in which:

FIGS. 4A and 4B are illustrations of an example method for accessing a secure space, according to at least one embodiment;

Figure 1A:
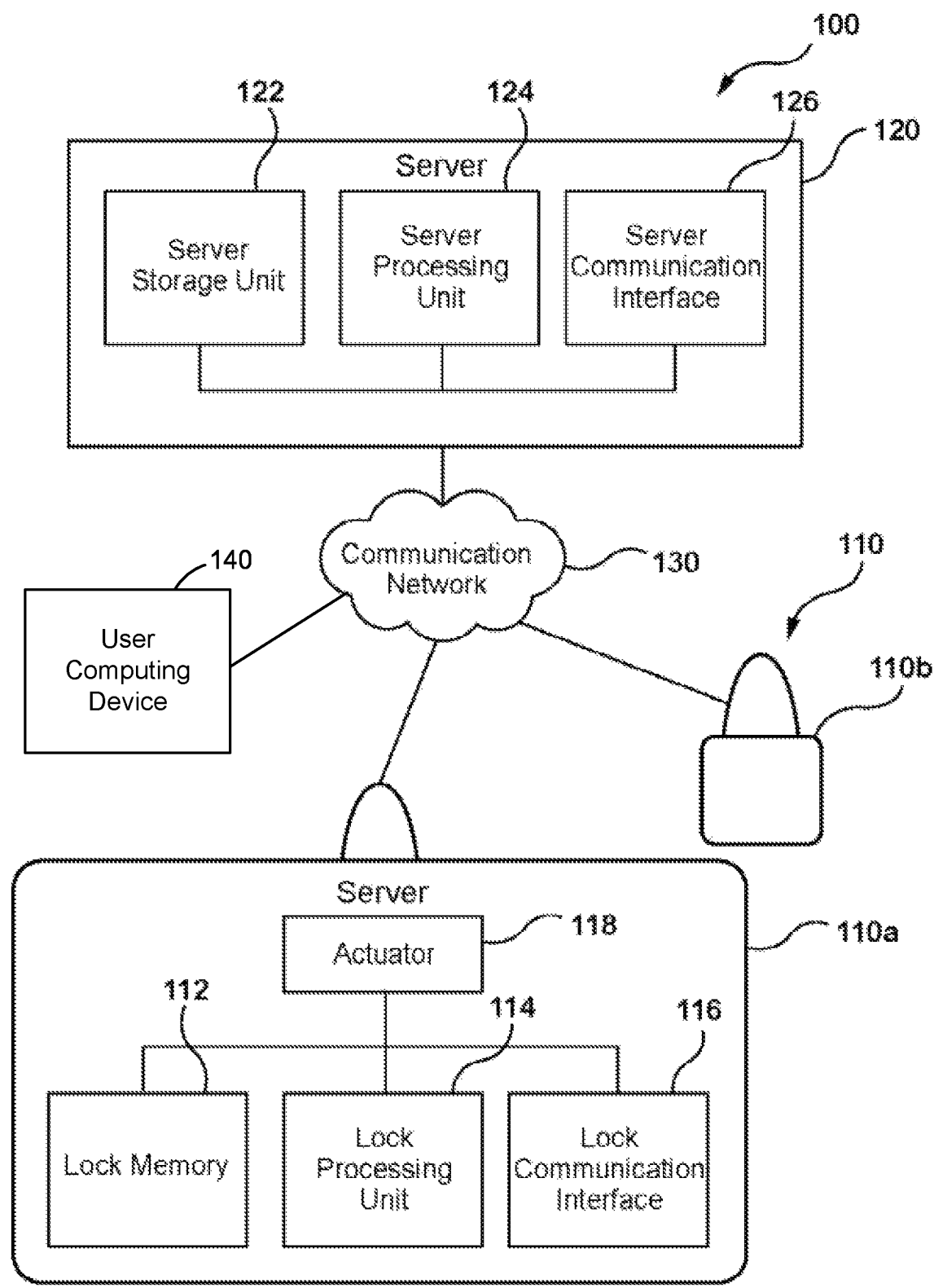
FIG. 1A is a diagram of a system for controlling access to a secure space, according to at least one embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

The various embodiments described herein generally relate to methods (and associated systems configured to implement the methods) for controlling access to a secure space. The term "secure space", as used herein, broadly refers to any physical space or unit of a central manager and designated for use by authorized users and to which access by unauthorized users is prevented by a locking device.

For example, the secure space can be a self-storage unit within a self-storage facility. In other embodiments, the secure space can be multiple individual units of physical space that share a centralized management system and each individual unit is accessible to different users. For example, the secure space can be lockers, rooms, or containers, equipment locks (e.g., bikes, skis, golf clubs) located within an apartment building, condominium, office space, transit hub (e.g., airports, train stations, bus stations), hotel, resort, school, campus, recreation center, community center, library, or hospital.

As can be seen from these examples of secure space, the duration that a user is authorized by the central manager can be limited. Self-storage units are typically rented on a monthly basis. Other forms of secure space can also be used for shorter or longer durations. For example, equipment locks may be rented on a daily basis.

A user, or a tenant of a secure space may want to allow someone else to access their secure space. A locking device requiring biometric data cannot be easily unlocked by other individuals. That is, the ability to unlock the device cannot be transferred amongst individuals.

A locking device requiring a physical key can be convenient as anyone in possession of the physical key can unlock the device. However, physical keys must be physically transferred between individuals. In addition, physical keys can be lost, stolen, and in some cases, replicated. Physical keys do not offer traceability in respect of identifying who has used the physical key.

The term "physical key", as used herein, broadly refers to any physical object that a locking device requires presentation of in order to transition to/from a locked state and an unlocked state. A physical key can include, but is not limited to, traditional physical keys, key fobs, and key cards, including barcodes, magnetic stripes, microchips, and/or radio frequency identification devices.

A locking device requiring a digital key can be convenient as anyone in possession of the digital key can gain unlock the device. However, once a digital key is shared, the ability to unlock the device can only be revoked by changing the password or key code.

In addition, in some cases, the central manager may need to unilaterally take control of a secure space. In the case of a self-storage unit, the self-storage facility may need to block access to a self-storage unit or evict a tenant for failure to pay rental fees or other violations of a rental agreement. For example, rental agreements typically prohibit self-storage units from being used as a place of residence.

To block access to a self-storage unit, an overlock can be installed on the self-storage unit. An overlock involves placing an extra lock on the locking device to prevent the locking device from allow access to the authorized user. When a self-storage facility evicts a tenant, the self-storage facility may vacate the tenant's contents, including selling the tenant's contents.

Care must be taken to ensure that such unilateral actions are being taken against the correct self-storage unit. Multiple individual units can look identical and identification of individual units can be subtle. Evicting the wrong unit will typically require compensation to the innocent tenant, thus resulting in financial losses for the central manager.

The central manager may rely on employees or other individuals to carry out such actions against a secure space. However, whether for innocent reasons or for other motives, such individuals may not strictly adhere to the central manager's instructions. For example, an employee may provide a tenant access to the secure space after an overlock has been installed. The employee may be convinced by the tenant that the overlock was placed in error. Alternatively, the employee may be financially induced by the tenant. In any event, such actions may not align with the objectives of the central manager.

Self-storage facilities are often located in remote locations that are may not be equipped with fast, reliable connectivity. Furthermore, self-storage facilities are often concrete buildings that can be a barrier for Wi-Fi signals. As such, systems of providing controlling access to a secure space requiring a communication network can encounter high latency, which can result in an undesirable delay in providing access to, or securing, a self-storage unit.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more elements are said to be "coupled", "connected", "attached", or "fastened" where the parts are joined or operate together either directly or indirectly (i.e., through one or more intermediate parts), so long as a link occurs. As used herein and in the claims, two or more elements are said to be "directly coupled", "directly connected", "directly attached", or "directly fastened" where the element are connected in physical contact with each other. None of the terms "coupled", "connected", "attached", and "fastened" distinguish the manner in which two or more elements are joined together.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

A description of an embodiment with several components in communication with each other does not imply that all such components are required. On the contrary a variety of optional components are described to illustrate the wide variety of possible embodiments described herein.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers may be a server, network appliance, embedded device, computer expansion module, a personal computer, laptop, personal data assistant, cellular telephone, smartphone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Figure 1B:
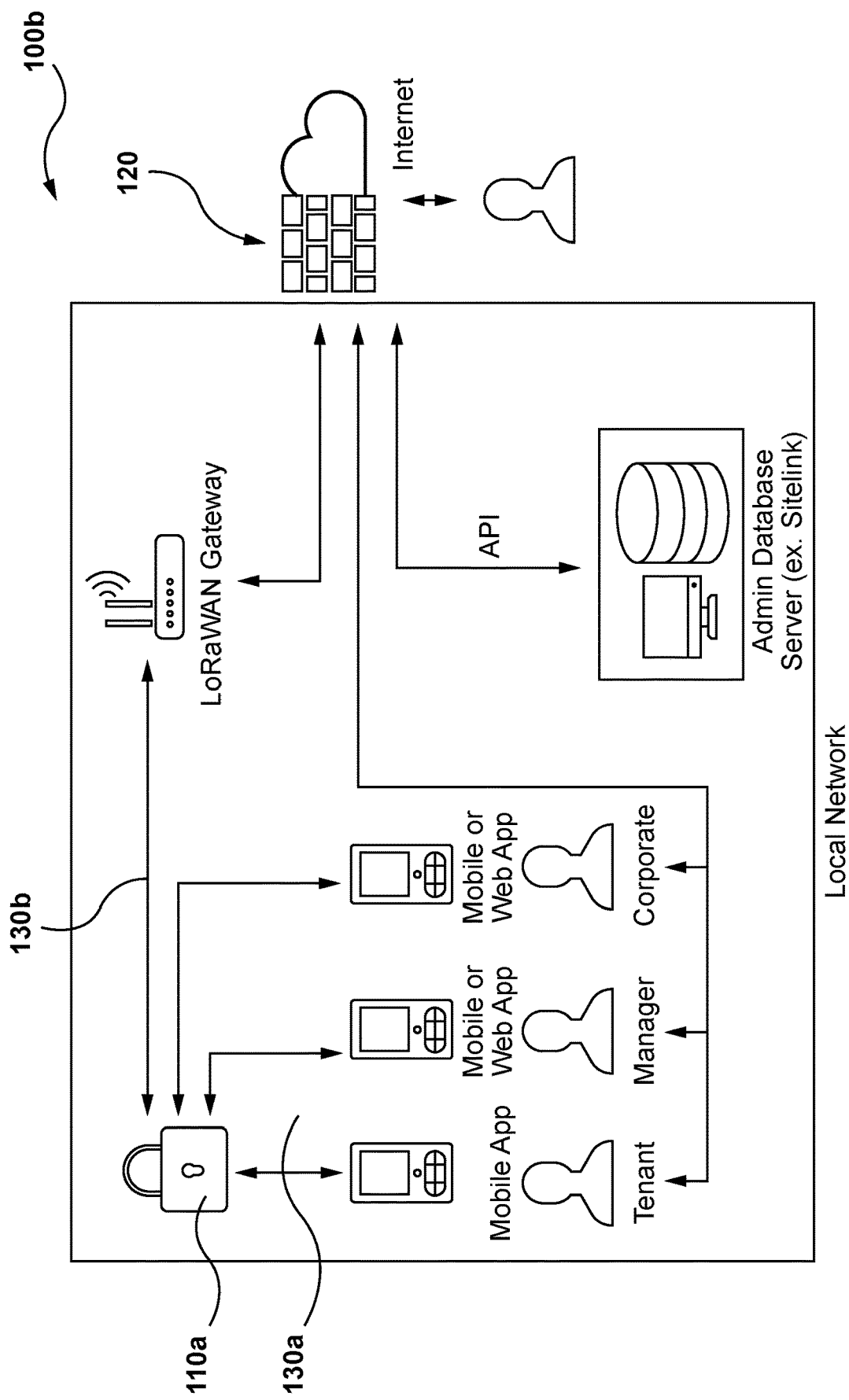
FIG. 1B is a diagram of a system for controlling access to a secure space, according to at least another embodiment.

Referring to FIG. 1, there is shown a diagram of a system 100 for controlling access to a secure space, according to at least one embodiment. The system 100 can include one or more locking devices 110 for one or more secure spaces, a server 120, a communication network 130, and a user computing device 140. Although only two locking devices 110a and 110b are shown in FIG. 1, it is possible for the system 100 to include fewer or more locking devices 110.

Similarly only one user computing device 140 is shown in FIG. 1 but it is possible for the system 100 to include more user computing device 140. The user computing device 140 can be associated with a tenant or a central manager, including personnel located on-site or off-site such as employees, site managers, and corporate administrators.

Although only one server 120 is shown in FIG. 1, it is possible for the system 100 to include one or more servers 120 that may be distributed over a wide geographic area and connected via the communication network 130.

Access to a secure space can be controlled by one or more locking devices 110. For example, a first locking device 110a can provide access to the site or the facility; a second locking device 110b can provide access to a particular floor of the facility; and a third locking device 110 can provide access to an individual unit on that floor of the facility.

The locking device 110 can secure access to a physical space at an access point. The term "access point", as used herein, broadly refers to an entrance of a secure space that has an open state for permitting access to the secure space from the access point and a closed state for preventing access to the secure space from the access point. An access point can be a door, a gate, a fence, two adjacent pieces of housing, or any other type of enclosure.

The locking device 110 can include a shackle for engaging with, or fastening to, a clasp on an access point of the physical space to keep the access point closed. The access point can be opened by disengaging the shackle from the clasp on the access point. In other embodiments, the locking device 110 may be directly fastened to the access point.

As shown in FIG. 1, the locking device 110a can include a lock processing unit 114, a lock memory (or data storage component) 112, a lock communication interface 116, and an actuator 118. The lock processing unit 114 facilitates the operation of the actuator 118 by providing a control signal for the actuator 118. The lock processing unit 114 can include any suitable processors, controllers or digital signal processors that can provide sufficient processing power depending on the configuration, purposes and requirements of the locking device 110. In some embodiments, the lock processing unit 114 can include more than one processing unit with each processing unit being configured to perform different dedicated tasks.

The lock memory 112 can store data to be used during the operation of the locking device 110 and/or to facilitate the operation of the locking device 110. Example data can include identification data for the locking device 110. Identification data can represent a model or type of the locking device 110. The identification data can also represent an identifier for that particular locking device 110. For example, the identification data can include, but is not limited to a LoRa MAC address. Identification data for the locking device 110 can be provisioned to the locking device 110 at the time that the locking device 110 is manufactured.

The lock memory 112 can also store authorization data for the locking devices 110 and the user computing devices 140. The authorization data can include one or more digital keys for the locking device 110 itself, the server 120, and for user computing devices 140 authorized to access the locking device 110. For example, at the time that the locking device 110 is manufactured, a public key of a public/private key pair belonging to the server 120 can be provisioned to the locking device 110 and stored in the lock memory 112. In addition, at the time that the locking device 110 is manufactured, the lock processing unit 114 can also generate a public/private key pair for the locking device 110. The locking device 110 can store the private key of its own public/private key pair in the lock memory 112 and provide the public key of its own public/private key pair to the server 120. The lock memory 112 can store a digital key identifier that can be unique for each digital access key. The digital key identifier can track each digital access key issued. The server 120 can provide the digital key identifier along with a pre-determined usage limit for that digital access key to the locking device 110. For each digital access key, the lock memory 112 can also store a local usage count. The local usage count for each digital access key can track the number of times each digital access key is used. The local usage count can be an integer number that is increased each time the digital access key is used.

The lock memory 112 can also store operating data of the locking devices 110. Operating data can relate to an operating state of the locking devices 110, such as a locked state, an unlocked state, an open state, and a closed state. Operating data of the locking devices 110 can also relate to an operating mode of the locking devices 110 such as a regular power mode or a low power mode. Operating data can also relate to movement of the locking device 110, attempted openings of the locking device 110, and a state of charge of an electrical energy storage unit of the locking device 110, if provided. Operating data typically includes temporal information, such as the date and time of events such as the date and time of a transition between states and/or modes.

The lock communication interface 116 can include any component for facilitating communication with the other components of the system 100 via the communication network 130. For example, the lock communication interface 116 can include a wireless transceiver for communicating within a wireless communications network. The lock communication interface 116 can communicate identification data and/or operating data of the locking devices 110 to the communication network 130. The lock communication interface 116 can receive commands from the communication network 130.

For example, the lock communication interface 116 can send data to the server communication interface 126, such as, but not limited to, battery state of charge and temperature status information, as well as lock, unlock, and tamper event information and send data to the server communication interface 126 such as, but not limited to, updates to authorization data (i.e., revoking previously authorized access) and firmware updates.

The actuator 118 can receive a control signal from the lock processing unit 114. Based on the control signal, the actuator 118 can move the locking device 110 into the locked state or the unlocked state. When the locking device 110 is in the locked state, the shackle can remain engaged with the clasp on the access point to keep the access point closed. When the locking device 110 is in the unlocked state, the shackle can be disengaged from the clasp on the access point to allow the access point to be opened.

The lock processing unit 114 can receive a security command from a user computing device 140 of a user, such as a tenant or central manager, either directly or indirectly via the communication network 130. For example, the security command received can include an unlock command or a lock command. Upon receipt of the security command, the lock processing unit 114 can determine whether the security command should be granted. If the security command should be granted, the lock processing unit 114 can generate a control signal for the actuator. If the security command should not be granted, the lock processing unit 114 does not generate a control signal for the actuator.

A security command involving an unlock command can be generated by the user computing device 140 of a user wishing to access the self-storage unit on which the locking device 110 is fastened to. Upon receipt of an unlock command, the lock processing unit 114 can determine, based on authorization data stored in the lock memory 112, whether the user computing device 140 is authorized to access the self-storage unit. If the lock processing unit 114 determines that the user computing device 140 is authorized to access the self-storage unit, the lock processing unit 114 can generate a control signal for the actuator 118 to move the locking device 110 into the unlocked state. Once the locking device 110 is in the unlocked state, the locking device 110 can be disengaged, removed, or positioned in a manner to allow the access point to be opened. If the lock processing unit 114 determines that the user computing device 140 is not authorized to access the self-storage unit, the lock processing unit 114 does not generate a control signal to move the locking device 110 into the unlocked state.

Similarly, a security command involving a lock command can be generated by the user computing device 140 of a user wishing to secure the self-storage unit on which the locking device 110 fastenable to. Upon receipt of a lock command, the lock processing unit 114 can determine, based on authorization data stored in the lock memory 112, whether the user computing device 140 is authorized to secure the self-storage unit. If the lock processing unit 114 determines that the user computing device 140 is authorized to secure the self-storage unit, the lock processing unit 114 can generate a control signal for the actuator 118 to move the locking device 110 into the locked state. The lock processing unit 114 can also automatically generate a control signal for the actuator 118 to move the locking device 110 into the locked state when the locking device 110 returns to the closed state after being in the open state. Once the locking device 110 is in the locked state, the locking device 110 cannot be disengaged, or positioned in a manner to allow the access point to be opened. That is, in the locked state, the locking device 110 remains engaged with the access point to keep it closed. If the lock processing unit 114 determines that the user computing device 140 is not authorized to secure the self-storage unit, the lock processing unit 114 may not generate a control signal to move the locking device 110 into the locked state.

The determination of the locked state of the locking device 110 may not be limited to the state of the locking device 110 in itself. In some embodiments, the locked state can also depend on a location of the locking device 110 and the pattern, behavior, or sequence of events at the locking device 110. The location of the locking device 110 can be determined by a signal strength of the locking device 110 to the communication network 130. In some embodiments, the location of the locking device 110 can be determined based on the location of neighbouring locking devices. For example, the location of the locking device 110 can be determined by a comparison of the signal strength of the locking device 110 to the signal strength of neighbouring locking devices.

In some embodiments, the security command can include a lock command or an unlock command. In some embodiments, the security command does not include an express lock command nor an express unlock command (i.e., the security command does not require data). Instead, upon receipt of a security command, the security command can be a command to change states. That is, the lock processing unit 114 can determine that the current state of the locking device 110 is the locked state and understand the security command as being an unlock command. Similarly, the lock processing unit 114 can determine the current state of the locking device 110 is the unlocked state and understand the security command as being a lock command.

In some embodiments, the security command can be manually initiated by a user interacting with the user computing device 140, that is, the user providing input to the user computing device 140. In some embodiments, the security command can be automatically generated by the user computing device 140 upon establishing a communication link with the locking device 110. In some embodiments, the security command can include requesting data identifying the user computing device 140.

In at least one embodiment, requesting data can be automatically sent from the user computing device 140 upon establishing a communication link with the locking device 110. Furthermore, in such cases, the requesting data can serve as a security command to change states, either from the locked state to unlocked state or from the unlocked state to the locked state.

In addition to receiving a security command and determining whether the user computing device 140 is authorized, the lock processing unit 114 may require additional conditions to be met. For example, the locking device 110 can also include a switch and the lock processing unit 114 may require the switch to be manipulated in order to generate a control signal that causes the actuator 118 to move the locking device 110 into the unlocked state.

In another example, the locking device 110 can also require a password or a key code to be entered in order to generate a control signal that causes the actuator 118 to move the locking device 110 into the unlocked state. In some embodiments, the password or key code can be an alternative to the security command generated by the user computing device 140. This can be appropriate for example, when the locking device 110 provides access to a plurality of users, such as for a site, a facility, or an entire floor.

In yet another example, the locking device 110 can include a physical key mechanism and the presentation of the physical key can itself unlock the locking device 110 or be required in addition to the security command generated by the user computing device 140.

In addition, the lock processing unit 114 can transmit the status of the locking device 110 to the server 120 via the communication network 130. In some embodiments such as but not limited to the alternative embodiment system 100b shown in FIG. 1B, the communication network 130 may include more than one communication network. For instance, the locking device 110 may receive a security command from the user computing device 130 via a first communication network 130a such as but not limited to a Bluetooth® Low Energy network and may transmit a signal such as a signal indicating a status of the locking device 110 to the server 120 via a second communication network 130b. In the embodiment shown in FIG. 1B, the second communication network is a LoRaWAN gateway communication network.

In some embodiments, the locking device 110 can include a timer (not shown in FIG. 1). The timer can be activated, or initiated, when the locking device 110 enters, or is transitioned to, an unlocked state. The timer can be configured to terminate when the locking device 110 in an open state, that is, when the locking device 110 is disengaged from the access point. The timer can be configured to expire after a pre-determined period of time that the locking device remains in a closed state, that is, when the locking device 110 remains engaged with the access point, after it enters that instance of the unlocked state. When the timer expires, the lock processing unit 114 can generate a control signal to move the locking device 110 into the locked state.

The locking device 110 can include with an electrical energy storage unit (not shown in FIG. 1) for supplying electrical power to circuit components of the locking device 110. Circuit components include the lock processing unit 114 and can include the actuator 118. The electrical energy storage unit can be a battery. The battery can be disposable or rechargeable. An electrical energy storage unit can be convenient as it can eliminate the need to run wires to each access point or each secure space.

In some embodiments, circuit components of the locking device 110 can be supplied with electrical power from a power supply via a wired connection. That is, electrical power can be supplied to the locking device 110 via a wired connection.

In some embodiments, the locking device 110 can remain in the same state when power is not supplied to circuit components of the locking device 110. That is, the locking device 110 can remain in the state immediately prior to power being disconnected from the circuit components. This can allow the electrical energy storage unit to be removed for maintenance when the locking device 110 is locked. The electrical energy storage unit can be removed and replaced, or temporarily removed for charging, if a wired charging connection is not available. The ability for the locking device 110 to remain locked without power to circuit components allows discharged electrical energy storage units to be managed on an as needed basis.

In some embodiments, the locking device 110 can operate in different modes, including a regular power mode and a low power mode to allow for an extended operating duration before recharging or replacement of the electrical energy storage unit. In the regular power mode, the locking device 110 may communicate operating data to the server 120 via the communication network 130. Such communication can occur on an event-basis. For example, the status of the locking device 110 can be transmitted when the locking device 110 transitions from the open state to the closed state. Such communication can also occur on a temporal basis. For example, the status of the locking device 110 can be transmitted on a regular schedule, such hourly.

In the low power mode, the locking device 110 may not communicate operating data to the communication network 130. In some embodiments, the locking device 110 can store the operating data in the lock memory 112 during the low power mode and then transmit the operating data to the communication network 130 in the next instance of the regular power mode.

In some embodiments, the locking device 110 in the low power mode can be switched into the regular power mode from distinct wakeup signals from the communication network 130. In some embodiments, the locking device 110 can include a sensor or a switch to receive user input for switching the locking device 110 from the low power mode to the regular power mode. For example, the sensor can detect motion representing user input, such as an accelerometer. When the locking device 110 includes a switch, the user input can also be used for switching the locking device 110 from the regular power mode to the low power mode.

In some embodiments, the locking device 110 can be switched into the regular power mode at pre-determined time intervals. That is, the locking device 110 can storing the operating data during the low power mode and wakeup (i.e., switching to the regular power mode) at predetermined time intervals to transmit the operating data to the communication network 130.

In at least one embodiment, the locking device 110 is padlock capable of wireless communication. A padlock can offer flexibility in being used in door systems of existing buildings. Furthermore, a padlock can be convenient as it can be interchangeable with other padlocks.

As shown in FIG. 1, the server 120 includes a server storage unit 122, a server processing unit 124, and a server communication interface 126. The server storage unit 122 can store data generated by the server processing unit and data received from the locking devices 110, user computing devices 140, other sensor units and output devices (not shown in FIG. 1). For example, the server storage unit 122 can store data to be in respect of the operation of the system 100, such as identification data, authorization data, access management data of the locking devices 110, facility data, and monitoring data of the secure space.

The server storage unit 122 can store identification data for the locking devices 110, the storage unit on which the locking devices are fastened to, and the user computing devices 140. Identification data for the locking devices 110 can include, but is not limited to, a LoRa MAC address that is provisioned to the locking device 110 when the locking device 110 is manufactured. Identification data for the storage unit can include, but is not limited to, a unit identifier for the storage unit that the locking device 110 is fastened to. Identification data for the user computing devices 140 can include but is not limited to an email address or an SMS phone number. Identification data for the user computing devices 140 can be provided to the server 120 when upon enrollment by the user of the user computing device 140.

Identification data can also include tokens used for enrolling the user computing device 140. The server storage unit 122 can generate a token for the enrollment of each user computing device 140. The token can be transmitted via an email address or an SMS phone number, inviting the user to prove ownership of the email address or SMS phone number. Each user can present the received token to the server 120 in order to prove the ownership of the email address or SMS phone number. Tokens can be valid after generation for a limited time period.

The server storage unit 122 can also store authorization data for the locking devices 110 and the user computing devices 140. The authorization data can include one or more digital keys for the server 120 itself, the locking devices 110, and user computing devices 140 authorized to access each of the locking devices 110. For example, the server storage unit 122 can store a private key of the public/private key pair belonging to the server 120 and whose public key was provided to a locking device 110 at the time of the manufacture of the locking device 110. The server storage unit 112 can also store a public key of the public/private key pair belonging to the locking device 110. The server storage unit 112 can also store a private key of a public/private key pair for each token and whose public key was provided to a user computing device 140 at the time of the enrollment of a user computing device 140. The server storage unit 122 can also store the public key of the public/private key pair belonging to the user computing device 140. The server storage unit 122 can also generate and store a digital access key to identify users authorized to access the locking device 110. The server 120 can provide the digital access key to the user computing device 140. The server 120 can provide the digital key identifier and a pre-determined usage limit to the locking device 110.

Access management data of the locking devices 110 can relate to security commands (including lock and unlock commands), and the operating data. Access management data typically includes temporal information, such as the date and time of events such as the date and time that security commands are received. Access management data generally forms a log or ledger of access for the secure space. That is, tenants and/or central managers can review the access management data to determine who has accessed the secure space, via the security commands, and the operating data of the locking device 110.

Facility data can relate to the physical environment of the facility, and the location of system components within the facility including but not limited to secure spaces, components of the communication network 120 (e.g., nodes that are described below), or sensor units, and output devices. The location can relate to a building, wing, or floor, or other relevant area identifier of the facility. It should be noted that locations can include both indoor and outdoor locations in and around the facility.

Monitoring data of the secure space can be received from other sensor units and output devices. Monitoring data can relate to an operating state of an access point to which the locking device is fastened to. The operating state of the access point can be an open state or a closed state. Monitoring data of the secure space can also relate to image data, motion data, lighting data, and heat data of the secure space The server storage unit 122 can also store computer programs that are executable by the server processing unit 124. For example, the computer programs can facilitate communication between the server 120 and the locking devices 110. Another example computer program can be an advanced image processing application. The server storage unit 122 can also store computer programs that are downloadable and executable by user computing devices 140 to facilitate communication between the server 120 and the user computing devices 140.

In some embodiments, the server storage unit 122 can instead be separate from the server 120 and be accessible to the server 120 via the communication network 130.

The server processing unit 124 can control the operation of the server 120. The server processing unit 124 may be any suitable processing units, controllers or digital signal processors that can provide sufficient processing power depending on the configuration, purposes and requirements of the server 120. In some embodiments, the server processing unit 124 can include more than one processing unit with each processing unit being configured to perform different dedicated tasks. The server processing unit 124 together with the lock processing unit 114 at the locking devices 110 contribute to the control of the system 100.

The server communication interface 126 facilitates communication between the server 120 and the other components of the system 100, such as the locking devices 110 and other sensor units and output devices, via the communication network 130. The server 120 can also connect to the Internet.

For example, the server communication interface 126 can receive data from the lock communication interface 116, such as, but not limited to, battery state of charge and temperature status information, as well as lock, unlock, and tamper event information and send data to the lock communication interface 116 such as, but not limited to, updates to authorization data (i.e., revoking previously authorized access) and firmware updates.

For example, the server communication interface 126 can receive data from the user computing device 140, such as, but not limited to, requests for authorization data, such as all currently issued digital access keys for the user computing device 140, and send data to the user computing device 140 such as, but not limited to, authorization data (requested or otherwise), and push notifications.

Some components of the server 120 may be virtualized in a cloud computing infrastructure. A cloud computing infrastructure can improve reliability and maintenance of the server. A cloud computing infrastructure can also allow a system 100 to manage client information and provide access control across a plurality of facilities.

The locking devices 110, the user computing devices 140, and the server 120 may communicate via the communication network 130. The communication network 130 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX, Zigbee, Z-Wave, Bluetooth®, Bluetooth® Low Energy, Long Range "LoRa"), SS7 signaling network, fixed line, local area network, wide area network (e.g., Long Range Wide Area Network "LoRaWAN"), and others, including any combination of these, capable of interfacing with, and enabling communication between the server 120, the locking devices 110, and user computing devices 140.

In some embodiments, more than one communication network 130 can be provided. For example, the locking devices 110 and the server 120 can communicate via first communication network 130 while the user computing devices 140 and the server 120 can communicate via a second communication network 130. In some embodiments, some locking devices 110 and/or user computing devices 140 can communicate with the server 120 via a first communication network 130 while other locking devices 110 and/or user computing devices 140 can communicate with the server 120 using a second communication network 130.

In some embodiments, the locking devices 110 and the server 120 can communicate via first communication network 130; the user computing devices 140 and the server 120 can communicate via a second communication network 130; and the locking devices 110 and the user computing devices 140 can communicate via a third communication network 130. For example, the locking devices 110 and the server 120 can communicate via a private Wide Area Network ("WAN"), such as but not limited to LoRaWAN; the user computing devices 140 and the server 120 can communicate via a public WAN such as but not limited a cellular network or Wi-Fi; and the locking devices 110 and the user computing devices 140 can communicate via a local point-to-point link, such as Bluetooth®.

The communication network 130 can include a network of nodes. The network of nodes can include one or more nodes for transmitting and receiving data from the components of the system 100 located in a facility, such as locking devices 110, user computing devices 140, and sensor devices. The network of nodes can be connected together. The network of nodes can be connected to the server 120. In some embodiments, the network of nodes can be connected via a wired connection and/or over a wireless connection. In some embodiments, nodes may include a video camera to collect visual information of the locking devices and/or the environment around the locking devices. The cameras may be a thermal camera, a digital camera, or the like. In some embodiments, the cameras may be generally maintained in a sleep state and programmed to awake upon receiving a signal indicating that the locking device or a door associated with a locking device has been opened. In some embodiments, the camera may be used to confirm a status of the door (e.g. open/closed). In some embodiments, the camera may be used to detect a thermal change in the door (e.g. detect whether the door is open/closed based on a thermal change).

For example, each locking device 110 and user computing device 140 may be equipped with a wireless communication interface to enable wireless communications according to a wireless protocol (e.g. LoRa, Bluetooth®, Bluetooth® Low Energy, Zigbee, or Z-Wave). Other components of the system 100 (e.g., sensor units and output devices) may also communicate using the communication network 130.

In some embodiments, the communication network 130 can be physically connected to the server 120. In some embodiments, the server 120 may be equipped with a wireless communication interface to enable wireless communications according to a Wi-Fi protocol (e.g. IEEE 802.11 protocol or similar).

The location of nodes can be pre-determined and stored on the server storage unit 122 as facility data. When a node communicates data received from a locking device 110 and/or user computing device 140 to the server 120, the node can also provide self-identifying data that the server 120 uses to determine the location of the locking device 110 and/or user computing device 140 from which the data originated based on the location of the node. In some embodiments, the location of the node can be taken as the location of the locking device 110 and/or user computing device 140. In other embodiments, the location of the locking device 110 and/or user computing device 140 can be determined based on the location of a plurality of nodes. Any appropriate algorithm for determining the location of the locking device 110 and/or user coming device based on the location of a plurality of nodes can be used, including but not limited to triangulation.

In some embodiments, the other components of the system 100 can include sensor units, output devices, gate controls, door sensors, cameras, motion detectors, and lights. Sensor units can collect data from the environment of the secure space. For example, the one or more sensors can include a LiDAR device (or other optical/laser, sonar, radar range-finding such as time-of-flight sensors). The one or more sensors can include optical sensors, such as video cameras and systems (e.g., stereo vision). The one or more sensor units can include motion sensors, light sensors, or heat sensors.

The user computing devices 140 may be any networked device operable to connect to the communication network 130. A networked device is a device capable of communicating with other devices through a network such as the communication network 130. A networked device may couple to the communication network 130 through a wired or wireless connection. LoRa, Bluetooth® or Bluetooth® Low Energy are examples of a wireless protocol that the user computing device 140 use to connect to the communication network 130.

User computing devices 140 may include at least a processing and memory, and may be an electronic tablet device, a personal computer, workstation, server, portable computer, mobile device, personal digital assistant, laptop, smart phone, wearable device, an interactive television, a video display terminal, gaming console, and portable electronic devices or any combination of these.

The user computing device 140 can operate computer programs to facilitate communication with the server 120 and/or communication network 130. The computer program can be downloaded from the server 120 or from a third-party server, such as an application store. Once the computer program is downloaded onto the user computing device, it can be executed by the user computing device. In some embodiments, the system 100 can include the computer programs that facilitate communication with the server.

In addition, the computer programs may be specific to the type of user. That is, the computer program for a client (i.e., a tenant) can be different from a computer program for a central manager (i.e., corporate administrators, district and/or site managers). The computer program for central managers can have additional functionalities compared to that of clients. For example, the central managers can access a mapping tool for illustrating status of a plurality of storage units.

In other embodiments, the user computing device 140 can operate an Internet browser to access a web portal that provides a similar function to the computer program. That is, a web portal can be used to facilitate communication with the server 120.

Functions of the computer program operating on the user computing device 140 to facilitate communication with the server 120 and/or communication network 130 may be dependent on its connection to the communication network 130 or a particular node of the communication network 130. This can allow functions of the computer program to be disabled or enabled based on the location of the user computing device. For example, the submission of a security command to unlock or lock a locking device 110, or the submission of a vacancy notice using the user computing device 140 may be enabled or disabled when the user computing device 140 is or is not in communication with the communication network 130, including a particular node or any nodes of the communication network 130. Communication with the communication network 130 can rely on the signal strength of the user computing device 140 to the communication network 130. Based on the signal strength of the user computing device 140 to the communication network 130, the location of the user computing device 140 on site or in proximity to a particular locking device 110 can be determined. In some embodiments, the location of the user computing device 140 can be determined by GPS operating on the user computing device.

It can be convenient to access self-storage units using a user computing device 140 such as a smartphone since smartphones are widely used. If at the last minute a user requires access to their self-storage unit, they are much more likely to have their smartphone with them than a physical key for their self-storage unit.

The user computing device 140 can also allow account management (i.e., personal or corporate accounts) and payments, and/or provide the account status, site status, and alerts.

As noted above, identification data for the user computing devices 140 can include but is not limited to an email address or an SMS phone number. Proof of ownership of such data can be used as a proxy for the identity of an individual user. In some embodiments, a method for verifying proof of ownership can involve, for example, the server 120 and user computing device 140 exchanging encrypted data such as one or more tokens.

For example, the method can begin with the server 120 generating an invitation token and a public/private key pair for the invitation token. The invitation token can include a pre-determined expiration date and time and the email address or SMS phone number whose ownership is being verified. The server 120 can encrypt the invitation token using the public/private key pair for the invitation token and transmit the encrypted invitation token along with the public key of the public/private key pair for the invitation token to the individual at the email address or the SMS phone number. The server 120 can store the public/private key pair for the invitation token as well as the email address or the SMS phone number that the invitation token relates to in the server storage unit 122.

The user computing device 140 can generate its own public/private key pair, and store the private key in the phone memory. The user computing device 140 can also retrieve an application token from the server 120. Upon receipt of the application token, the encrypted invitation token and public key for the invitation token from the server, the user computing device 140 can respond to the invitation by transmitting a request to receive a digital access key. The request to receive a digital access key can include the application token and the invitation token (that was decrypted using the public key of the public/private key pair for the invitation token). The user computing device 140 can encrypt the application token and the invitation token using the public/private key pair for the user computing device 140. The user computing device 140 can transmit the encrypted application token and invitation token along with the public key of the public/private key pair for the user computing device 140 to the server 120.

Upon receipt of the request to receive a digital access key, the server 120 can verify that the invitation token is valid. The server 120 can determine that the invitation token is valid if: the public key for the invitation token exists in the server storage unit 122, the private key for the invitation token in the server storage unit 122 can decrypt the invitation token, the pre-determined expiration date and time of the invitation token has not passed, and the email address or the SMS phone number of the invitation token exists in the server storage unit 122. Upon determining that the invitation token is valid, the server 120 considers ownership to be proven and can store the email address or the SMS phone number of the invitation token in relation with the application token. In addition, the server 120 can remove the invitation token and its corresponding public/private key pair from the server storage unit 122.

In some embodiments, the server 120 can periodically check outstanding tokens in the server storage unit to determine if they have expired. In some embodiments, the outstanding tokens can be removed from the server storage unit 122. In some embodiments, the server 120 can resend the invitation token to the email address or SMS phone number.

After proof of ownership of the email address or the SMS phone number has been established, the server 120 can generate and provide digital access keys to the user computing device 140. For example, digital access keys can be generated and provided to the user computing device 140 and the locking device 110 when a tenant has extended their paid through date, a tenant has requested a key be delivered to a surrogate, or a manager requests a master key.

Figure 2:
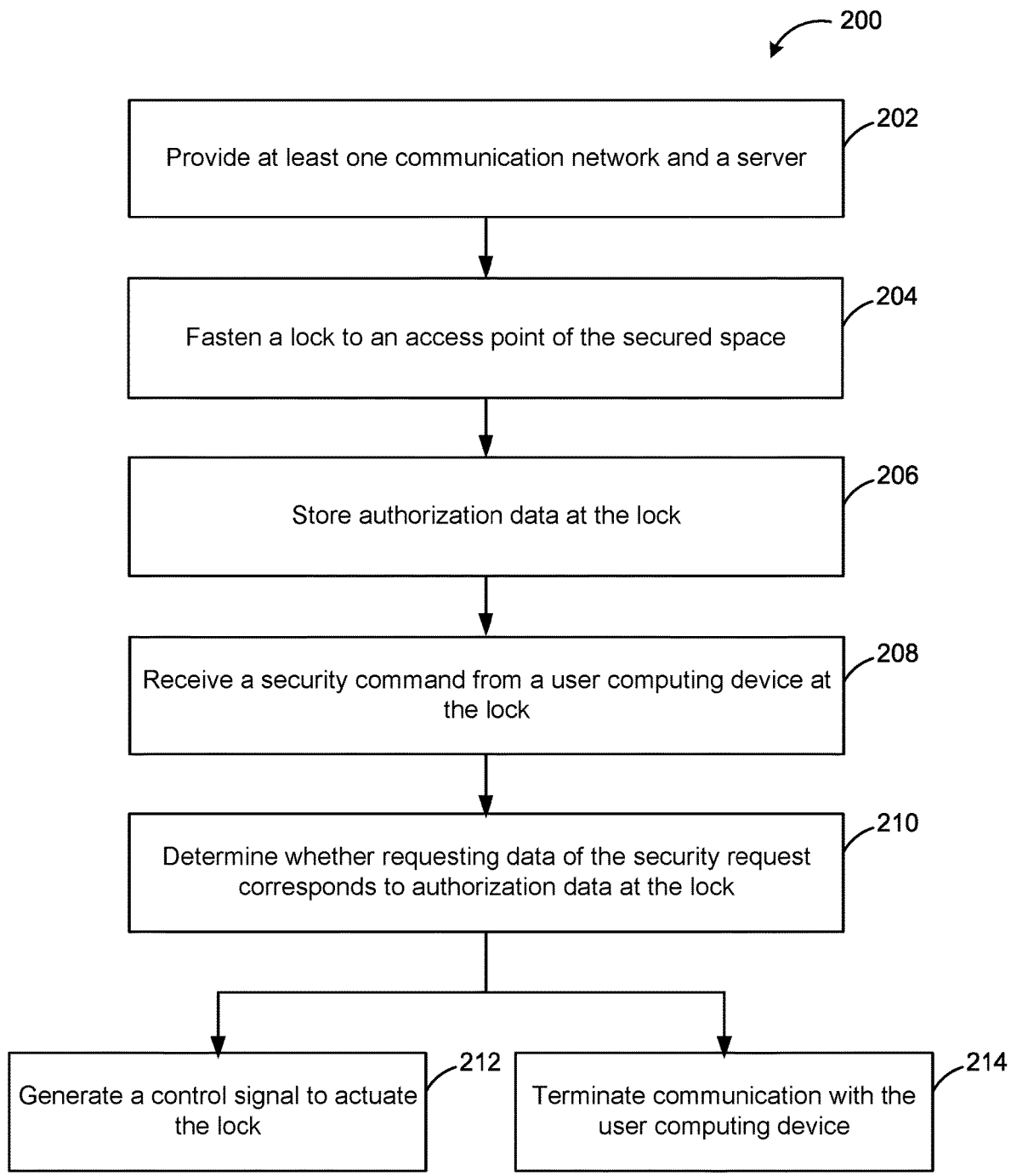
FIG. 2 is an example method for providing controlling access to a secure space, according to at least one embodiment.

Referring now to FIG. 2A, steps for an example method of controlling access to a secure space is shown in a flowchart diagram 200. At step 202, at least one communication network 130 and a server 120 can be provided.

At step 204, a locking device 110 can be fastened to an access point of the secure space. The locking device 110 can be positioned so that in the locked state, the locking device 110 can maintain the access point closed and in the unlocked state, the locking device 110 can allow the access point to be opened.

At step 206, the server 120 can generate authorization data for the user computing device 140 and store the authorization data on the locking device 110 and the user computing device 140. The authorization data can include a digital access key. For example, the digital access key can be one of a tenant access key, a surrogate access key, and a master access key.

A digital access key includes a public key of a public/private key pair belonging to the user computing device 140 and a public key of a public/private key pair belonging to the locking device 110. For example, to identify the user computing device 140, the user computing device 140 can generate a public/private key pair upon installation of a computer program to facilitate communication between the user computing device 140, the server 120, and the locking devices 110. The user computing device 140 can store the private key of its own public/private key pair in a phone memory and provide the public key of its own public/private key pair to the server 120. As noted previously, the LoRa MAC address and the public key of the public/private key pair belonging to the locking device 110 was provided to the server 120 at the time the locking device 110 was manufactured.

After receiving the public key of the user computing device 140, the server 120 can generate a digital access key (i.e., tenant access keys, surrogate access keys, or master access keys) that includes the public key of the user computing device 140, LoRa MAC address and the public key of the locking device 110, and a certificate of the server 120 that signs the digital access key. The digital access key can be provided to the user computing device 140.

The digital access key can also include one or more of a generation date, a pre-determined start date, a pre-determined expiration date, a pre-determined expiration period, a pre-determined usage limit, and/or the digital key identifier. The server 120 can provide the digital key identifier and the pre-determined usage limit of the digital access key can be provided to the locking device 110.

A generation date can relate to the date and time that the digital access key is generated or issued. A pre-determined start date can relate to a fixed date and time (e.g., day, month, and year) that the digital access key will become valid. For example, a digital access key may be generated in advance of when the tenancy will begin. In some embodiments, the pre-determined start date can be omitted and the digital access key can become valid upon issuance.

A pre-determined expiration date can relate to a fixed date and time (e.g., day, month, and year) that the digital access key will expire. That is, the digital access key can become invalid after the expiration date. The pre-determined expiration date is typically used with tenant access keys, for which access is authorized until a particular date, such as a "paid through" date.

A pre-determined expiration period can relate to a fixed duration from issuance of the digital access key (e.g., time duration from issuance) that the digital access key is valid. That is, the digital access key can expire after the fixed duration. The pre-determined expiration period is typically used with surrogate access keys (e.g., couple hours from issuance) and master access keys (e.g., few minutes from issuance).

A pre-determined usage limit can relate to a fixed number of times that the digital access key can be used. That is, the digital access key can become expended after it has been used a pre-determined number of times. Pre-determined usage limit is typically used with surrogate access keys (e.g., small number of uses) and master access keys (e.g., one time use) while tenant access keys can typically be used an unlimited number of times. In some embodiments, the pre-determined usage limit can be configurable by a user computing device 140. For example, the user of a user computing device 140, such as a tenant, can select the pre-determined usage limit for a surrogate access key. The local usage count for the digital access key can be compared against the pre-determined usage limit. If the local usage count exceeds the pre-determined usage limit, the lock processing unit 114 can determine that the digital access key is invalid. If the local usage count does not exceed the pre-determined usage limit, the lock processing unit 114 can determine that the digital access key is valid.

In some embodiments, the digital access key can have a combination of two or more of a pre-determined expiration date, a pre-determine expiration period, as well as a pre-determined usage limit. In some embodiments, the digital access key can become invalid (i.e., expire or expended) upon the earliest of the pre-determined expiration date, the pre-determine expiration period, and the pre-determined usage limit.

In some embodiments, the digital access key for a locking device 110 can be reissued. The digital key identifier can be monotonically increased for each new reissue of a key. By tracking each issued key, keys can also be revoked by simply reissuing a new key. For example, digital access keys can be reissued when there is a new pre-determined expiration date (i.e., tenancy has been extended), upon request by the tenant, upon request by a manager. Digital access keys can also be automatically reissued on a regular basis for good security practices. To revoke keys, the locking device 110 can be configured to require digital key identifiers be greater than a given threshold corresponding to the digital key identifier at the time of revocation.

When issuing a digital access key, a certificate authority signs the digital access key with a certificate. The use of certificates can enhance security. The locking device 110 can reject digital access keys based on the certificate used to sign the digital access key. For example, a certificates may not be valid at the time that the digital access key is presented to the locking device 110. A certificate can include a pre-determined start date and not be valid yet at the time that the digital access key is presented to the locking device 110. A certificate can include a pre-determined end date and be expired by the time the digital access key is presented to the locking device 110.

The server 120 acts as a certificate authority. As noted earlier, the system 100 can include one or more servers 120 that are distributed over a wide geographic area and connected via the communication network 130. As such, a plurality of certificate authorities can be used to reduce the load of key signing for a single certificate authority. In addition, a plurality of certificate authorities allows the certificate authorities to be distributed over different geographic locations, which can mitigate denial of service attacks that are often location specific. Furthermore, the plurality of certificate authorities can be used sequentially to form one or more certificate chains to enhance security. The certificate chains can each terminate with the same root certificate authority. Use of certificate chains can reduce the use of the root certificate authority, thereby reducing the risk of compromising the root certificate authority. The certificates can include the public key of the certificate authority that issued the certificate and the public key of the certificate authority that will receive the certificate.

By providing authorization data to the locking device 110 in advance of a request to gain access to the locking device 110, the method 200 can mitigate delays caused by unreliable connectivity typically experienced in self-storage facilities.

Returning now to FIG. 2, at step 208, a user may seek to gain access to the locking device 110 and provide a security command to the locking device 110. The security command can include requesting data identifying the user computing device 140. That is, the security command can include one or more digital access keys to be validated.

In some embodiments, the user computing device 140 provide the security command to the locking device 110 by connecting to the locking device 110 via a communication network 130 such as but not limited to a Bluetooth® Low Energy network. The user can physically manipulate the locking device 110, such as pressing a button on the locking device 110, to cause the locking device 110 to begin transmitting advertising data in a Bluetooth® signal. The button on the locking device 110 can be a button dedicated to begin transmitting a communication signal, or it can be any other button for operating the lock and be configured to transmit a communication signal during operation. The advertising data can include identification data for the locking device 110 such as the LoRa MAC address of the locking device 110.

The user computing device 140 can scan for Bluetooth® signals from the locking devices 110. The scan for Bluetooth® signals can be initiated by a computer program operating on the user computing device 140 that facilitates communication between the user computing device 140, the server 120, and the locking devices 110.

Upon detection of the Bluetooth® signal from the locking device 110, the user computing device 140 can determine whether the advertising data includes a LoRa MAC address that corresponds to any digital access keys stored on the user computing device 140. It the advertising data matches a digital access key stored on the user computing device 140, the user computing device 140 can provide a security command to the locking device 110.

At step 210, the lock processing unit 114 can be configured to determine whether the security command includes requesting data that corresponds to the authorization data stored in the lock memory 112 for that user computing device 140 at step 206. That is, the lock processing unit 114 can determine whether the user computing device 140 has provided a digital access key corresponding to the digital access key stored in the lock memory 112.

When the lock processing unit 114 compares the requesting data received from the user computing device 140 to the authorization data stored in the lock memory 112, the lock processing unit 114 can determine whether the digital access key provided by the user computing device 140 corresponds to the authorization data provided to the locking device 110 by the server 120. This validation of digital access keys can involve the locking device 110 and the user computing device 140 exchanging encrypted data using key pairs such as the public/private key pair of the user computing device 140.

In some embodiments, the validation of digital access keys can involve the locking device 110 and the user computing device 140 exchanging a series of encrypted data. In some embodiments, the data being encrypted can be random data (i.e., random nonce). In some embodiments, the data exchanged can be encrypted using the public/private key pair of the user computing device 140. In some embodiments, the data exchanged can also be encrypted using a session key pair generated by the user computing device 140 or the lock processing unit 114. The session key pair can be a temporary key pair that is generated when the user computing device 140 is in the vicinity of the lock processing unit 114 and seeks to gain access.

For example, the user computing device 140 can generate a session key pair and send the public key to the locking device 110. Upon receipt of the public key of the user computing device 140's session key pair, the lock processing unit 114 can also generate a session key pair belonging to the locking device 110 and send the public key of its own session key pair to the user computing device 140.

Upon receipt of the public key of the locking device's 110 session key pair, the user computing device 140 can encrypt the digital access key received from the server 120 (i.e., tenant access key, surrogate access key, or master access key) using one of, or both of the session key pairs—that is, the public key of the session key pair of the locking device 110 and/or the private key of the session key pair of the user computing device 140. The user computing device 140 can send the encrypted digital access key (i.e., tenant access key, surrogate access key, or master access key) to the locking device 110.

Upon receipt of the encrypted digital access key (i.e., tenant access key, surrogate access key, or master access key) from the user computing device 140, the lock processing unit 114 can decrypt the digital access key using the private key of the session key pair of the locking device 110 and/or the public key of the session key pair of the user computing device 140. The lock processing unit 114 can validate the digital access key by determining whether it corresponds to authorization data received from the server 120 and stored in the lock memory 112.

Determining whether the digital access key corresponds to authorization data involves determining whether the digital access key is valid. The lock processing unit 114 can determine whether the current date and time is after the pre-determined start date of the digital access key, if any. In addition, the lock processing unit 114 can determine whether the digital access key has expired or been expended based on the pre-determined expiration date, pre-determined expiration period, and pre-determined usage limit, if any. The lock processing unit 114 can also determine whether the digital access key has been revoked, based on the digital key identifier.

If the lock processing unit 114 determines that the digital access key is valid, the lock processing unit 114 can encrypt a random nonce using the private key of the session key pair of the locking device 110 and/or the public key of the session key pair of the user computing device 140. The lock processing unit 114 can send the encrypted random nonce to the user computing device 140.

Upon receipt of the encrypted random nonce from the locking device 110, the user computing device 140 can decrypt the random nonce using the public key of the session key pair of the locking device 110 and/or the private key of the session key pair of the user computing device 140. The user computing device 140 can sign the random nonce using the private key corresponding to the public key of the user computing device 140 included in the digital access key and provided by the server 120, that is, the private key of the public/private key pair generated upon installation of a computer program to facilitate communication between the user computing device 140, the server 120, and the locking devices 110. The user computing device 140 can encrypt the signed random nonce using the public key of the session key pair of the locking device 110 and/or the private key of the session key pair of the user computing device 140. The user computing device 140 can send the encrypted, signed random nonce to the locking device 110.

Upon receipt of the encrypted, signed random nonce from the user computing device 140, the locking device can decrypt the signed, random nonce using the private key of the session key pair of the locking device 110 and/or the private key of the session key pair of the user computing device 140. The lock processing unit 114 can verify whether the random nonce is the same random nonce that it previously transmitted to the user computing device 140 and whether the random nonce was signed using by a key corresponding to the public key of the user computing device 140 included in the digital access key and provided by the server 120. That is, the lock processing unit 114 can verify whether the random nonce was signed using the private key of the public/private key pair generated upon installation of a computer program to facilitate communication between the user computing device 140, the server 120, and the locking devices 110. If verified, the lock processing unit 114 can determine that the user computing device 140 is authorized and the method 200 can proceed to step 212.

If the lock processing unit 114 determines that the user computing device 140 is not authorized (i.e., any one of the digital access key received from the server 120 being invalid, the random nonce received from the user computing device 140 being different from the random nonce generated by the lock processing unit 114, or the random nonce was not signed by a key corresponding to the public key of the user computing device 140 included in the digital access key and provided by the server 120), the method 200 can proceed to step 214.

At step 212, in response to determining that the requesting data corresponds to the authorization data stored for the user computing device 140, the lock processing unit 114 can be configured to generate a control signal for the actuator 118 based at least in part on the security command. If the security command is an unlock command, the lock processing unit 114 can generate a control signal for the actuator 118 to move the locking device 110 into the unlocked state. If the security command is a lock command, the lock processing unit 114 can generate a control signal for the actuator 118 to move the locking device 110 into the locked state.

At step 214, in response to determining that the requesting data does not correspond to the authorization data stored for the user computing device 140, the lock processing unit 114 can terminate communication with the user computing device 140.

Figure 3:
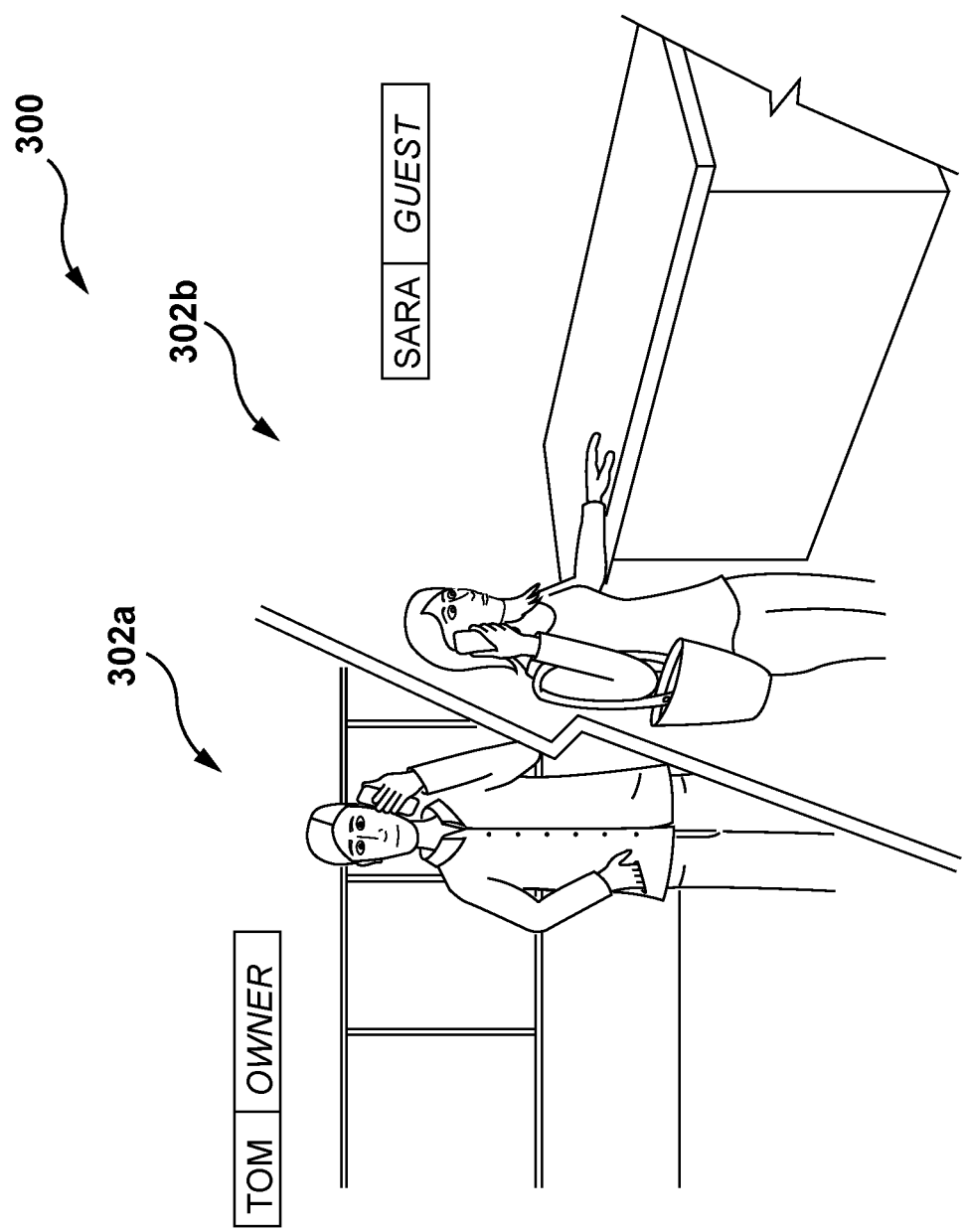
FIG. 3 is an illustration of an example scenario for requesting access to a secure space, according to at least one embodiment.
Figure 4B:
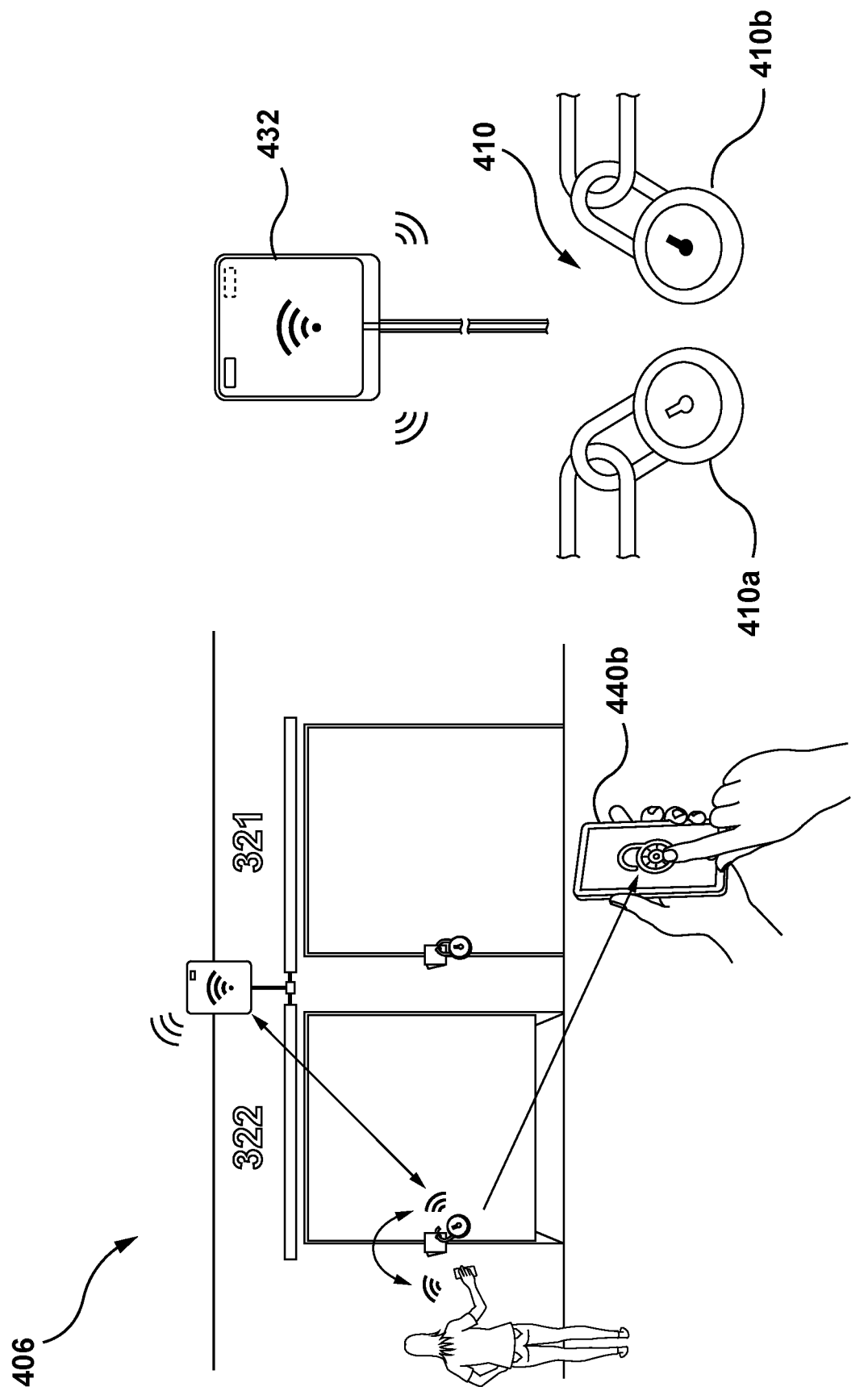

Reference will now be made to FIGS. 3, 4A, and 4B simultaneously. FIG. 3 illustrates an example scenario 300 for requiring access to a secure space and FIGS. 4A and 4B illustrate an example method 400 of requesting access to a secure space, according to at least one embodiment. In this example, the secure space is a self-storage unit.

In scenario 300, a tenant has stored items in their self-storage unit at a self-storage facility 302b. The tenant is the only user with access to the self-storage unit. A trusted third-party requires an item stored in the tenant's self-storage unit. However, the tenant is located in a first location 302a and cannot conveniently go to the self-storage unit to retrieve the item. Furthermore, the tenant's key is located at the tenant's home, a second location. The trusted third-party does not have access to the tenant's home to retrieve the key. The tenant trusts the third-party with access to the self-storage unit but the third-party was not setup on the self-storage unit account because the tenant did not foresee that the third-party would require access.

In method 400, at step 402, the trusted third-party can download and execute the computer program onto their user computing device 440 to facilitate communication with the server 120 from their user computing device 440. The trusted-third party may use the computer program setup an account. At step 404, the tenant can use the computer program on their user computing device 440 to share access with the trusted third-party. More specifically, the tenant can initiate the generation and transmission of a digital authorization token 442 to the trusted third-party's user computing device 440 to allow the trusted third-party's user computing device 440 to submit a security command to the locking device 410 (shown in FIG. 4B) for the tenant's self-storage unit.

At step 406, the trusted third-party can go to the site of the self-storage unit 302b. Using their user computing device with the computer program operating therein, the trusted third-party can obtain access through the main access gate, locate the tenant's self-storage unit 444a, and submit a security command to unlock the locking device 410. The security command from the user computing device can be communicated wirelessly to the locking device 110, via the communication network 130. The communication network 130 can include one or more nodes 432 for transmitting and receiving data from the components of the system 100 located in a facility including user computing devices 432. LoRa, Bluetooth® or Bluetooth® Low Energy can be used to communicate the security command from the user computing device 440 to the locking device 110.

The security command can be processed by the locking device 110. The security command can include requesting data, such as digital access keys, a password passcode, or fingerprint data that are related user account information. The locking device 110 can determine whether the security command may be granted, based on whether the requesting data corresponds to authorization data stored in the lock memory 112.

When the security command is granted, the locking device 110 generates a control signal for the actuator based on the security command. For example, for an unlock command, the locking device 410 unlocks and the trusted third-party is able to pull down the body of the locking device 410, releasing the shackle so the locking device 410 can be removed and the door to the self-storage unit can be opened. If authorization data for the locking device 410b indicated that the tenant's account was in poor standing (i.e., virtually overlocked), then the digital access key will be found invalid, the security command will not be granted and the control signal is not generated. An account may be in poor standing for non-payment of rental fees and other issues.

Figure 5:
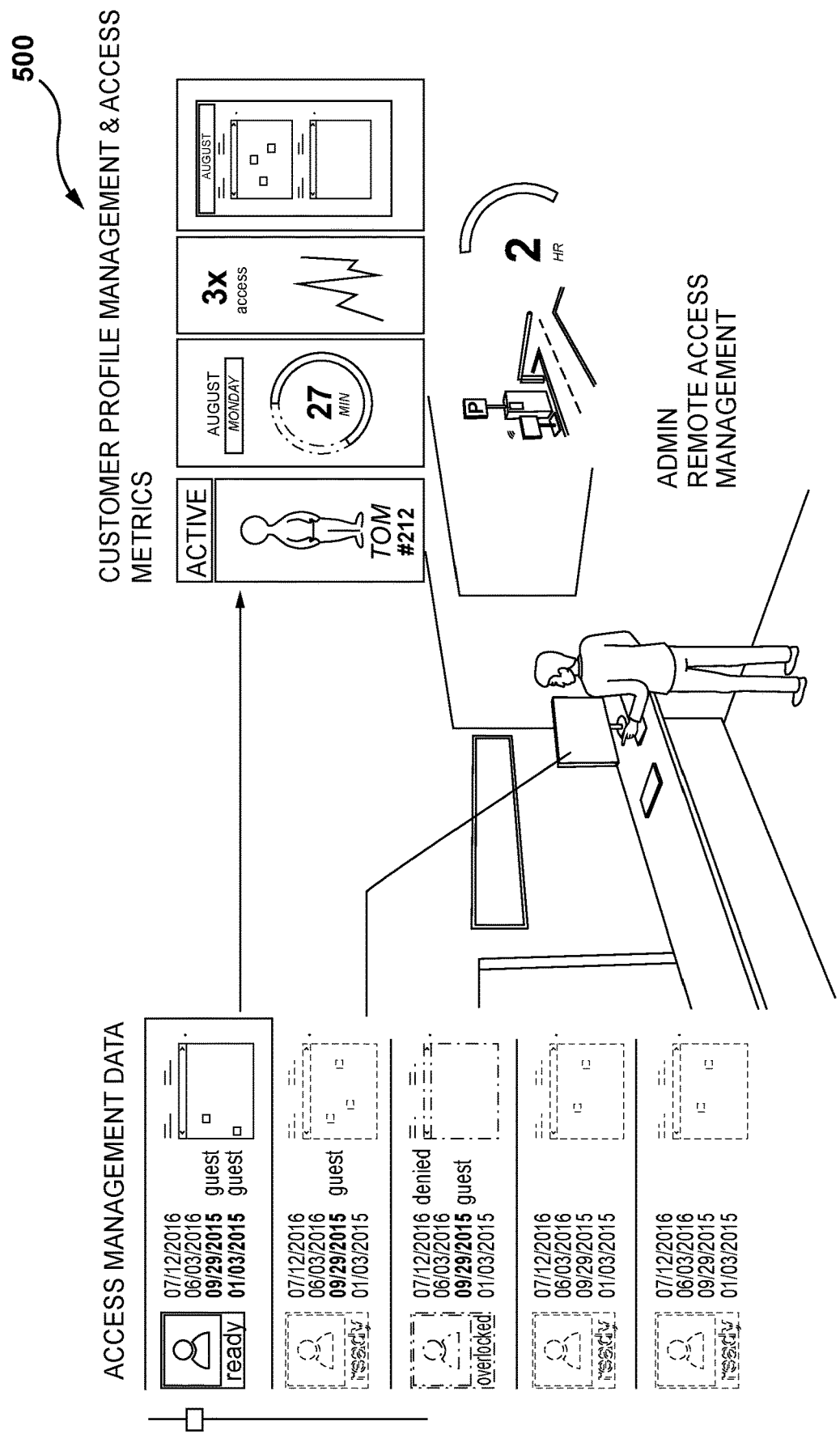
FIG. 5 is an illustration of data that can be made available by the system, according to at least one embodiment.

Referring now to FIG. 5, shown therein is an illustration 500 of data that can be made available by the system 100 to central managers, according to at least one embodiment.

The central managers can review statuses of user accounts (i.e., customer profile management), access management data and metrics, or system alerts generated based on monitoring data. The central managers can access this data on-site or remotely from a user computing device 140 via a web portal or a computer program.

Figure 6:
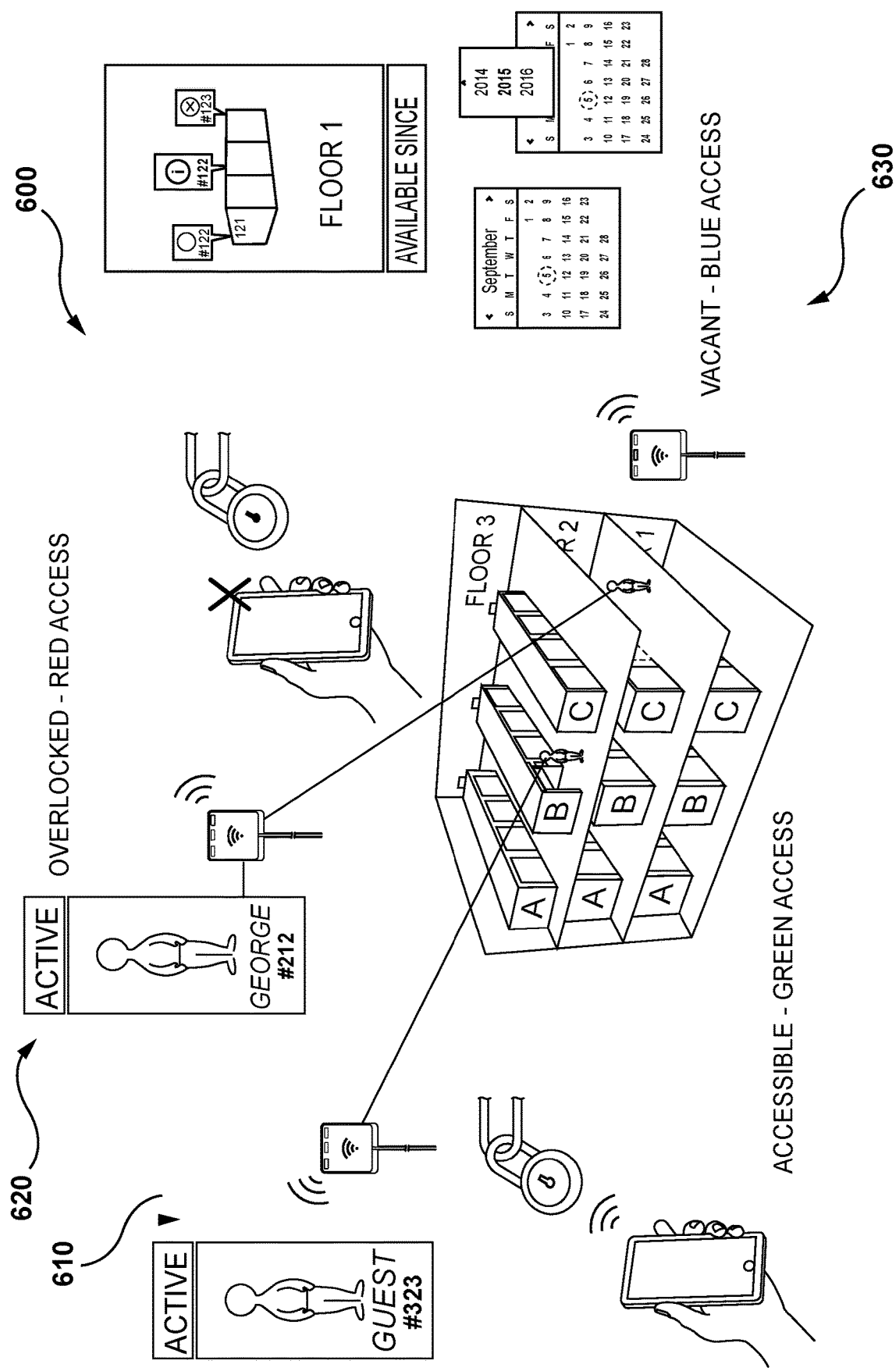
FIG. 6 is an illustration of different statuses that secure spaces can have, according to at least one embodiment.

Referring to FIG. 6, shown therein is an illustration 600 of different statuses that secure spaces can have, according to at least one embodiment. In this example, the secure space is a self-storage unit. The status of the self-storage units at a site can be illustrated in a mapping tool of the computer program for central managers. Statuses illustrated can include, but is not limited to: (1) occupied and accessible (i.e., good standing) 610; (2) occupied and virtually overlocked (i.e., poor standing) 620; and (3) vacant 630. Each of the statuses in the mapping tool can also be color coded. For example, occupied and accessible 610 can be green; occupied and virtually overlocked 620 can be red; and vacant 630 can be blue.

Figure 7:
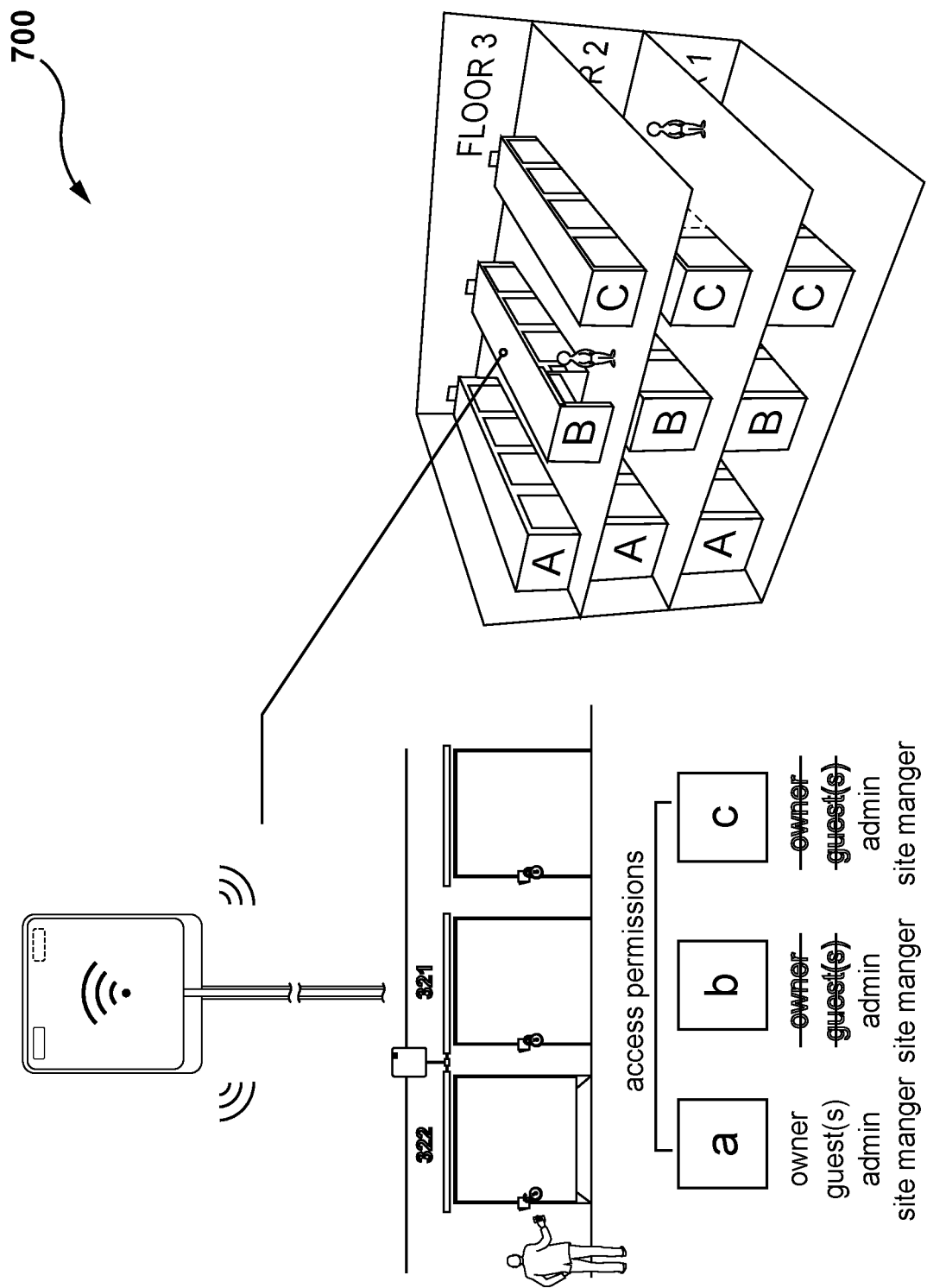
FIG. 7 is an illustration of different permissions to the secure spaces, according to at least one embodiment.

Referring to FIG. 7, shown therein is an illustration of different permissions to secure spaces, according to at least one embodiment. In this example, the secure space is a self-storage unit. When a self-storage unit is occupied and in good standing 610, the self-storage unit is accessible by the tenant and any trusted third-parties that the tenant provides access to. When a self-storage unit is occupied and in poor standing 620, the self-storage unit is not accessible by the tenant or any trusted third-parties, including the tenant, until the self-storage unit is returned to good standing. In the meantime, the self-storage unit is accessible by central managers including an administrator and site manager. When a self-storage unit is vacant 630, it is available for rental and accessible by central managers including an administrator and site manager.

Figure 8:
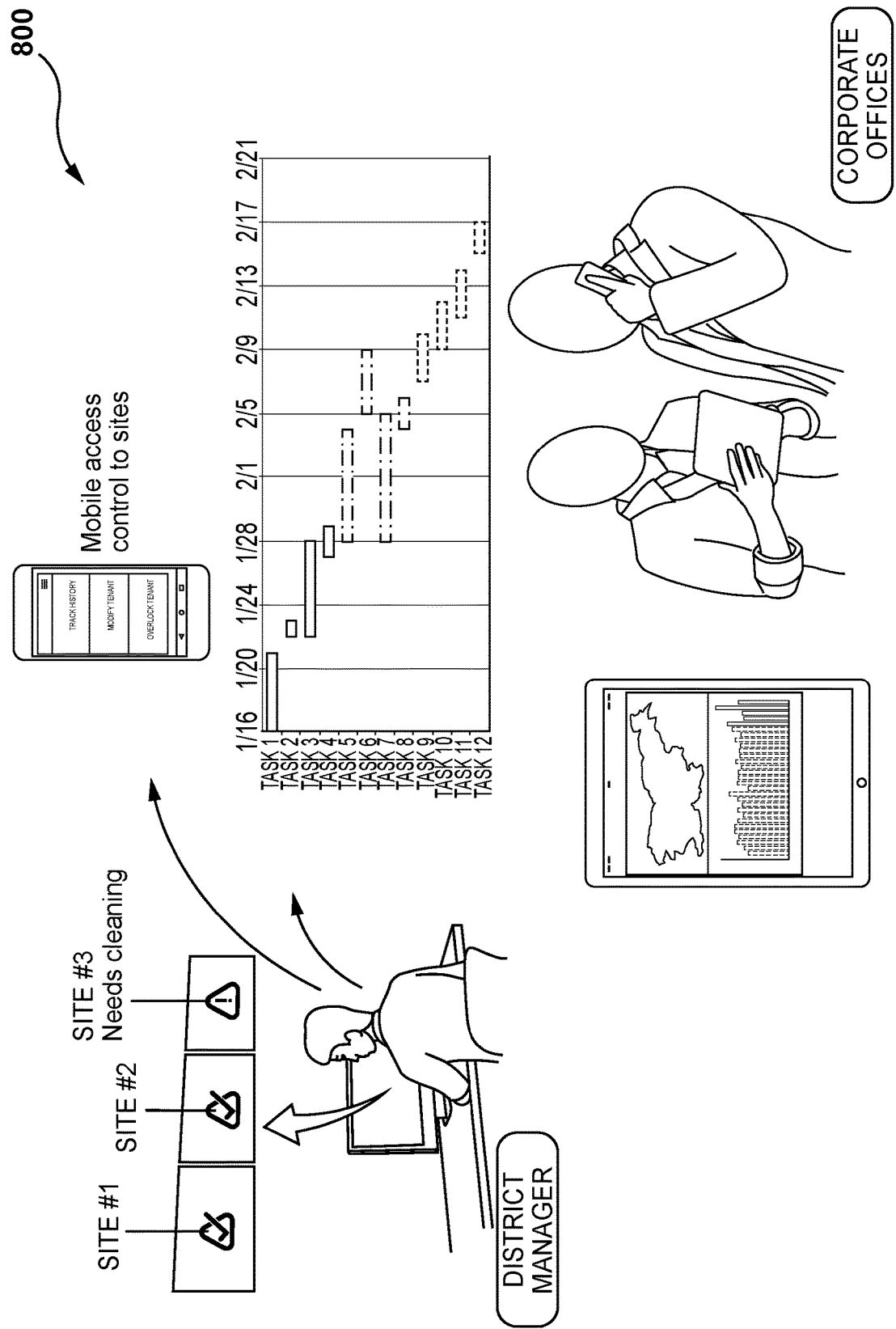
FIG. 8 is an illustration of a district management having control of multiple sites, according to at least one embodiment.

Referring to FIG. 8, shown therein is an illustration 800 of a user computing device of central managers having control of multiple sites, according to at least one embodiment. A computer program operating on the user computing device of a central manager can access data and analytics from all sites, including, but not limited to access frequency information, site vacancy statistics, sales throughput, alert and error notices, and geoanalytics.

The systems and methods disclosed herein can allow for continuous monitoring of the secure space. For example, the server processing unit 124 can generate alerts based on analysis of the operating data of the locking devices 110 and/or the monitoring data of the secure space. The alerts can be transmitted to a central manager at a user computing device 140. A central manager can include personnel located on-site (i.e., local) or off-site (i.e., remote) such as employees, site managers, and corporate administrators.

For example, a user may enter an entrance gate of the facility and that user is the only user in the facility. The server processing unit 124 can identify a locking device 110 and a storage unit associated with the user account of the user. If a locking device 110 that is not associated with the user account communicates operating data indicating that the locking device 110 is being manipulated, then an alert can be triggered. In some embodiments, the alert can be automatically transmitted to the user to let them know that they are at the wrong unit or the wrong floor.

In some embodiments, the alert can also cause image data, including video data, to be automatically provided to a site manager. The site manager may not be on site at the time and can view the alert and the image data on a user computing device 140 to assess the situation. If the site manager observes that the user appears to be innocently attempting to access the wrong unit, the site manager can send a message to the user to assist and/or guide them to the correct unit. For example, the site manager can let the user know that they are on the wrong floor.

Alerts can be triggered based on any event including but limited to timed events, unexpected behavior, or missing events. For example, a user can enter the site and unlock their self-storage unit. If a long duration, such a several hours, passes without a locking event, an alert may be triggered. In another example, when two distinct users enter the main gate and only one locking device 110 is unlocked, an alert may be triggered. In another example, once the user enters the site, alerts can be provided to guide the user to their self-storage unit. More specifically, upon entering the site, communication from the user computing device 140 to nodes of the communication network 130 can be used to determine the location of the user. For example, the alerts can provide directions including but not limited to "continue to the end of the hallway", "turn left", "turn right", "take the elevator", etc. . . .

In another example, an alert may be triggered when the locking device 110 is in the locked state but also the open state. This can occur if the locking device 110 has been physically tampered with, such as cut or broken, which is typically performed by someone who does not have, or cannot obtain authorization to unlock the locking device 110 (e.g., theft or tenant in poor standing circumventing an overlock).

In another example, an alert may be triggered when the locking device 110 is in the closed state but also the unlocked state for some period of time. This can occur if a user has physically closed the locking device 110 and failed to provide a command to lock the locking device 110. That is, after a locking device 110 is physically closed, the system can expect to receive a locking command within some period of time. After such time has elapsed without receipt of a locking command, the alert can be triggered. This can occur when, for example, a user simply forgets to provide the command, or if a failure occurs in the transmission of the lock command between the user computing device 140, the server 120, and the locking device 110.

The server processing unit 124 can update the authorization data based on the access management data, monitoring data and/or information received from the user. For example, when a tenant moves out, the tenant may submit a vacancy notice. A vacancy notice can include capturing image data of the empty secure space and transmitting the image data to the server 120. The server processing unit 124 can operate an image processing application to assess whether the received image data shows an empty secure space. If the server processing unit 124 determines that the secure space is empty, the authorization data for that locking device 110 can be updated from an occupied in good standing status to a vacant status. In this manner, the secure space can be placed in a vacant status without manual input.

In some embodiments, the server processing unit 124 can also process the image data to verify identifying information, such as a unit number. In some embodiments, the server processing unit 124 can also process metadata related the image data to confirm the location that the image data was captured, or the time that the image data was captured. In some embodiments, the image data can be captured by other system components such as sensor units (described in more detail below).

In some embodiments, alerts can relate to authorization data. The server storage unit 122 can store a list of user accounts to be notified when a particular, or a type of secure space becomes vacant. For example, some users be looking to rent a self-storage unit and others may be looking for a larger self-storage unit. When a secure space becomes available for rent, that is, when the status of the corresponding locking device 110 becomes vacant, an alert can be transmitted to user accounts who wish to be notified. Users may then rent the vacant self-storage unit from the computer program executing on the user computing device 140. Upon the new tenant completing the rental process such as agreeing to a rental agreement, providing payment, and any other requisites, the server processing unit 124 can update the authorization data for that locking device 110 from the vacant status to the occupied in good standing status.

Corporate administrators, including district managers, can have access to multiple servers 120 that manage individual facilities or a single server 120 that is configured to manage multiple facilities. An account associated with a corporate administrator can have different analytics and views from what the site managers can view. However corporate administrators and site managers can have a similar level of access and control. In particular, corporate administrators and site managers can each have the ability to block access to (i.e., virtually overlock) an individual locking device.

Referring to FIGS. 9A-9E, illustrated therein are perspective views of a locking device 900 in a closed state, according to at least one embodiment.

Figure 9E:
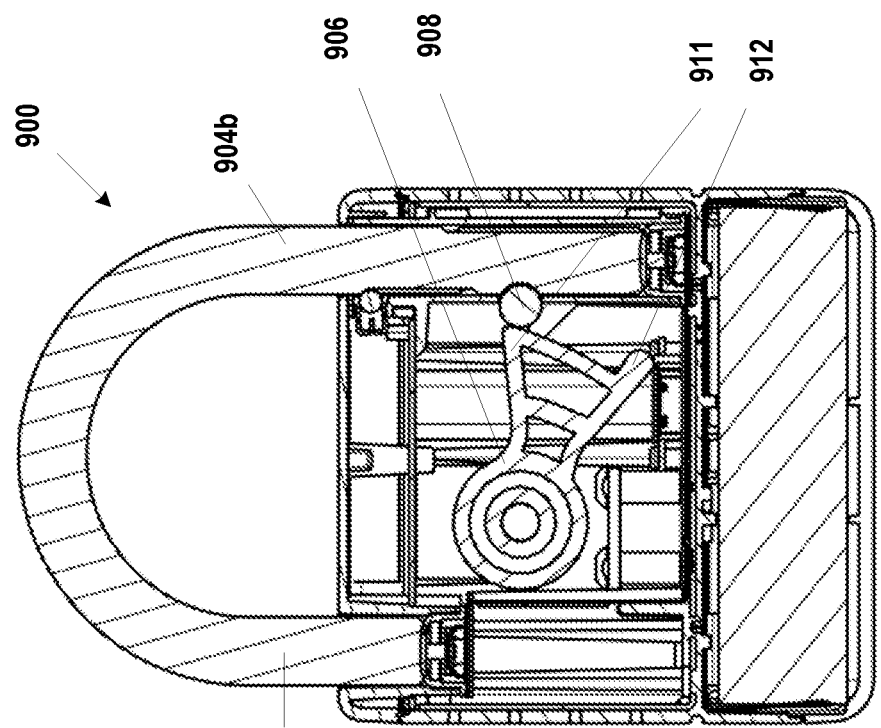
FIG. 9E is a cross-sectional view of the locking device of FIG. 9A along the line A-A in FIG. 9D, the cross-sectional view showing the locking device in a locked state with its locking pin in a closed position, according to at least one embodiment.
Figure 9A:
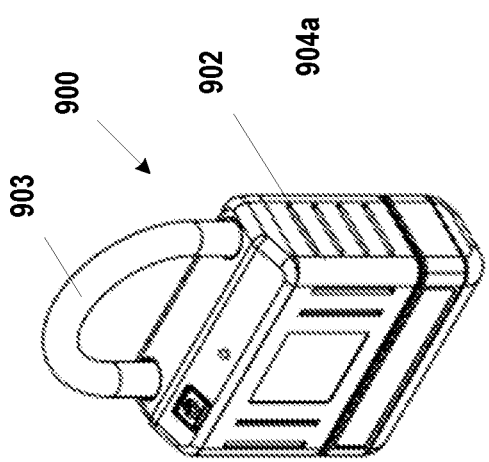
FIG. 9A is a perspective view of a locking device, according to at least one embodiment.

FIG. 9A shows the locking device 900 as a pad lock that includes a body 902 and shackle 903 Shackle 903 has two arms 904a and 904b and is arranged to be movable between a closed position (see for example FIGS. 9A-9E) wherein bottom portions of both of the arms 903a and 903b are secured within the body 902 and an open position (see FIG. 12) wherein the bottom portion of one of the arms 904 is secured within the body 902 and the other one of the arms 904 is withdrawn from the body 902. When the locking device 900 is in the closed position (see for example FIGS. 9A-9E), the locking device 900 can be in either a locked state, a partially locked state, or an unlocked state. It should be noted that locking device 900 should not be limited to being a pad lock. Locking device 900 could be another type of lock including but not limited to a cam lock, a cylinder lock, a tubular lock, a pin tumbler lock, or the like.

In at least one embodiment, the shackle 903 can be a part of an electrical circuit and an electrical current can be applied to the shackle 903. When the shackle 903 is closed, the electrical circuit may form a closed loop and provide a signal indicating that the locking device 900 is in the closed state. However, when the electrical circuit does not form a closed loop, that is, when the shackle 903 is open or cut, the signal indicating the shackle 903 is in the closed position is not provided, indicating that locking device 900 is in the open state. Further details are provided below. In at least one embodiment, the circuit may be an optical circuit may be included to indicate the state of the shackle 903. For instance, in at least one embodiment, the circuit could be an optical circuit such as but not limited to a light pipe or a light tube, where a light source and a detector are configured to indicate the state of the shackle 903.

Figure 9D:
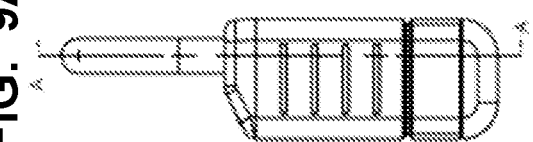
FIG. 9D is a side view of the locking device of FIG. 9A.
Figure 9B:
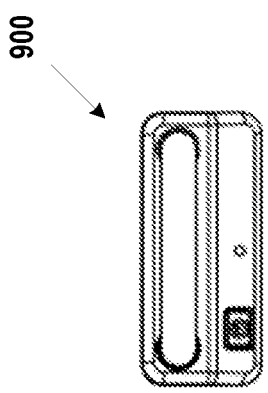
FIG. 9B is a top down view of the locking device of FIG. 9A.
Figure 9C:
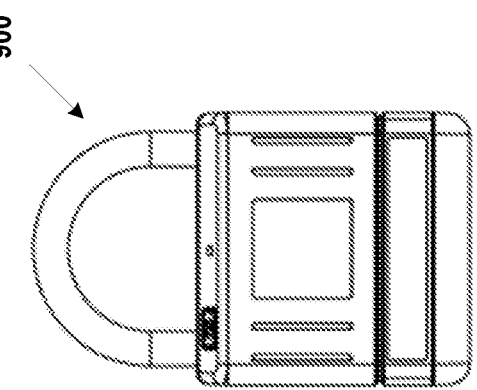
FIG. 9C is a front view of the locking device of FIG. 9A.

Referring now to FIG. 9E, illustrated therein is a cross-sectional view from top to bottom of the locking device 900 of FIGS. 9A and 9D along the line A-A shown in FIG. 9D. FIG. 9E shows the main internal components of the locking device 900 when the locking device 900 is in a closed and a locked state, according to at least one embodiment.

Body 902 includes a rotatable locking cam 906 and a locking pin 908. Rotation of the rotatable locking cam 906 controls engagement of the locking pin 908 with a groove 910 of one of the arms 904 of the shackle 903 when the locking device 900 is in the closed state. When the locking pin 908 engages the groove 910 of one of the arms 904 of the shackle 903 (e.g. arm 904b), the one of the arms 904 is secured within the body 902 and the shackle 903 is retained in its locked position. When the locking pin 908 disengages the groove 910 of the one of the arms of the shackle 903 (e.g. arm 904b), the one of the arms 904 is secured within the body 902 and the shackle 903 is free to move to its unlocked position. Rotation of rotatable locking cam 906 is controlled by a drive system (described below).

Rotatable locking cam 906 includes a locked paddle 911 and an unlocked paddle 912. In at least one embodiment, each of the locked paddle 911 and the unlocked paddle 912 extend towards the one of the arms 904 (e.g. arm 904b) of the shackle 903. In at least one embodiment, locked paddle 911 and unlocked paddle 912 may be made of a non-magnetic material. In at least one embodiment, locked paddle 911 and unlocked paddle 912 may be made of a magnetic material. Locked paddle 911 is typically positioned vertically above the unlocked paddle 912 in a direction towards a top end of the locking device 900, however, in at least one embodiment, the locked paddle 911 may be otherwise configured relative to unlocked paddle 912. As shown in FIG. 9E, when the locking device 900 is in the locked position, the locked paddle 911 directly engages the locking pin 908 and supports the locking pin 908 to engage groove 910 of the shackle 903.

As shown in FIG. 9E, when the locked paddle 911 of the rotatable locking cam 906 directly engages the locking pin 908, the locking pin 908 is engaged with a groove 910 of one of the arms 904 of the shackle 903 and the one of the arms 904 of the shackle 903 is retained within the body 902. At this position, the locking device 900 is in a locked state.

Body 902 also includes a power supply 920 (e.g. battery) for supplying electrical power to the drive system (described below).

Figure 10:
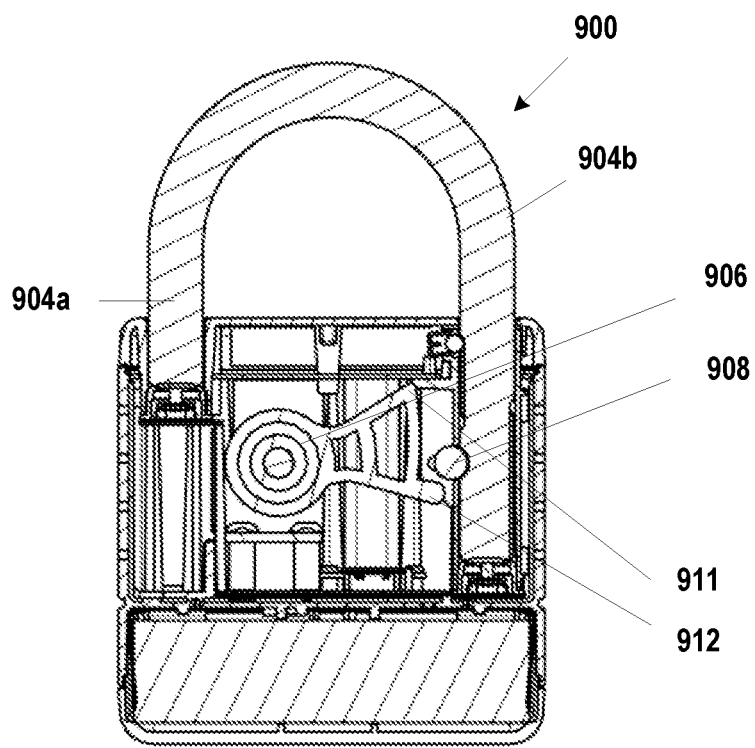
FIG. 10 is a cross-sectional view of the locking device of FIG. 9A along the line A-A in FIG. 9D, the cross-sectional view showing the locking device in an unlocked state with its locking pin in its closed position, according to at least one embodiment.

Turning to FIG. 10, as the locking cam 906 rotates away from the locked position relative to the shackle 903, for example in a counter-clockwise direction, (e.g. upwardly relative to shackle 903 and/or the body 902), the locked paddle 911 disengages from the locking pin 908. In FIG. 10, the locking pin 908 is shown in the locked position when it is engaged with the groove 910 of the shackle 903. In this position, the locking device 900 is in a partially locked state. As a user, for example, applies a force to the shackle 903 to move the shackle 903 from the closed position to the open position (thereby withdrawn from the body 902), the locking pin 908 will disengage from the groove 910 and shift laterally relative to the arm 904 of the shackle 903 (e.g. in a left direction as shown in FIG. 10).

Figure 11:
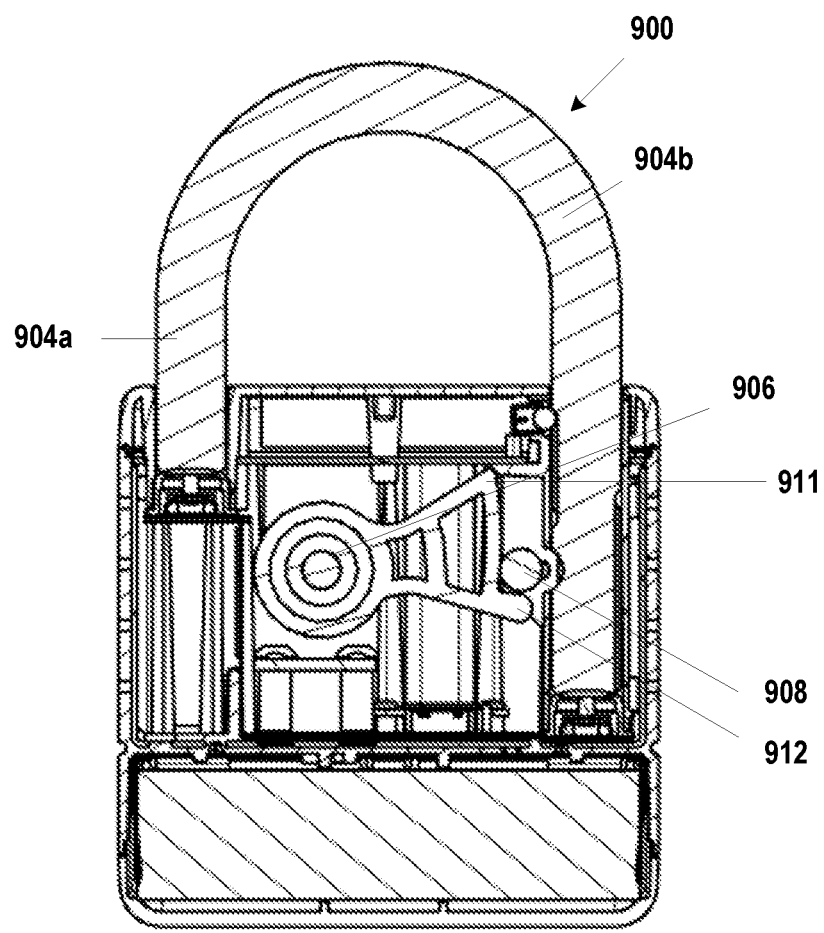
FIG. 11 is a cross-sectional view of the locking device of FIG. 9A along the line A-A in FIG. 9D, the cross-sectional view showing the locking device in an unlocked state with its locking pin in its open position, according to at least one embodiment.

Turning to FIG. 11, illustrated therein is an embodiment of the lock 900 of FIGS. 9A-9E where the locking pin 908 is shown to be open (i.e. disengaged from the groove 910 of the shackle 903). In at least one embodiment, the locking pin 908 can disengage from the groove 910 and shift laterally relative to the arm 904 of the shackle 903 in response to the shackle 903 being pulled upwardly (e.g. the upward force applied to the shackle 903 translates to a lateral force on the groove 910 that pushes the pin laterally away from the shackle). In at least one embodiment, the locking pin 908 can disengage from the groove 910 and shift laterally relative to the arm 904 of the shackle 903 by gravity. In at least one embodiment, the locking pin 908 can disengage from the groove 910 and shift laterally relative to the arm 904 of the shackle 903 by the action of a biasing device, such as but not limited to a spring or a magnetic actuator (e.g. the locking pin 908 is made of a magnetic material and a magnetic actuator pulls or pushes the pin laterally).

Figure 12:
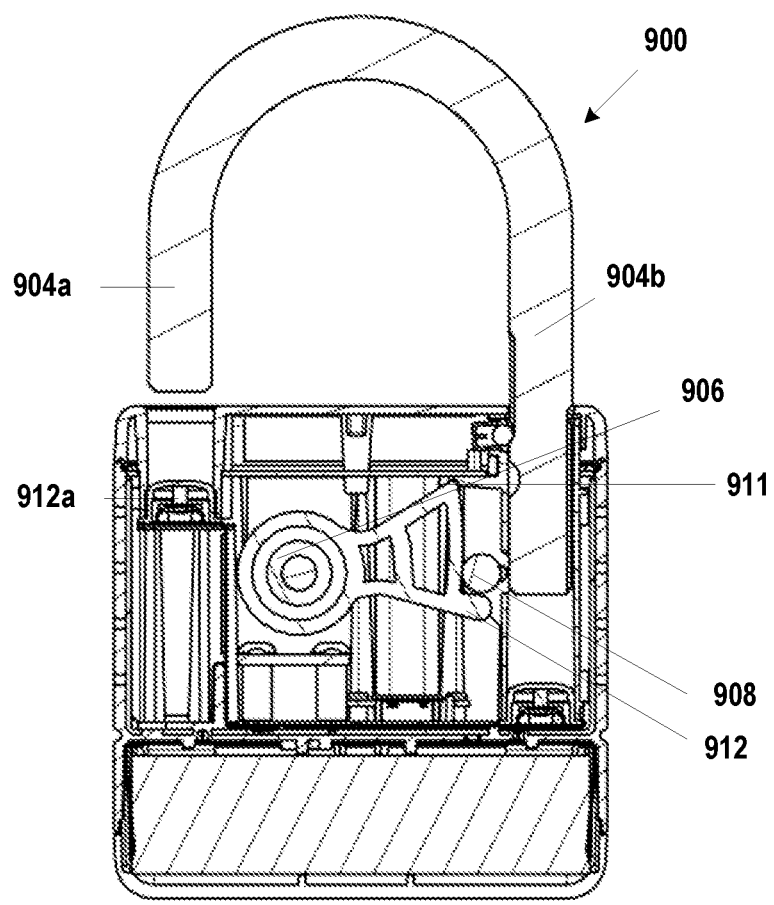
FIG. 12 is a cross-sectional view of the locking device of FIG. 9A along the line A-A in FIG. 9D, the cross-sectional view showing the locking device in an unlocked state with its locking pin in its open position and its shackle in its open position, according to at least one embodiment.

Referring now to FIG. 12, illustrated therein is another embodiment of lock 900 including two detection switches 914. In this embodiment, one detection switch 914 is positioned to detect the position of each arm 904 of the shackle 903. For instance, as shown in FIG. 12, detection switch 914a is positioned below arm 904a when arm 904a is received in the body 902 of the lock 900 and detection switch 914b is positioned below arm 904b when arm 904b is received in the body 902 of the lock 900.

Each detection switch 914 is configured to have to a first state to indicate when the shackle 903 is in its open state and a second state to indicate when the shackle 903 is in its closed state. For instance, as shown in FIG. 12, first detection switch 914a is in its first state to indicate that the arm 904a of shackle 903 is in its open state. Similarly, second detection switch 914b is in its first state to indicate that the arm 904b of shackle 903 is in its open state.

Figure 13:
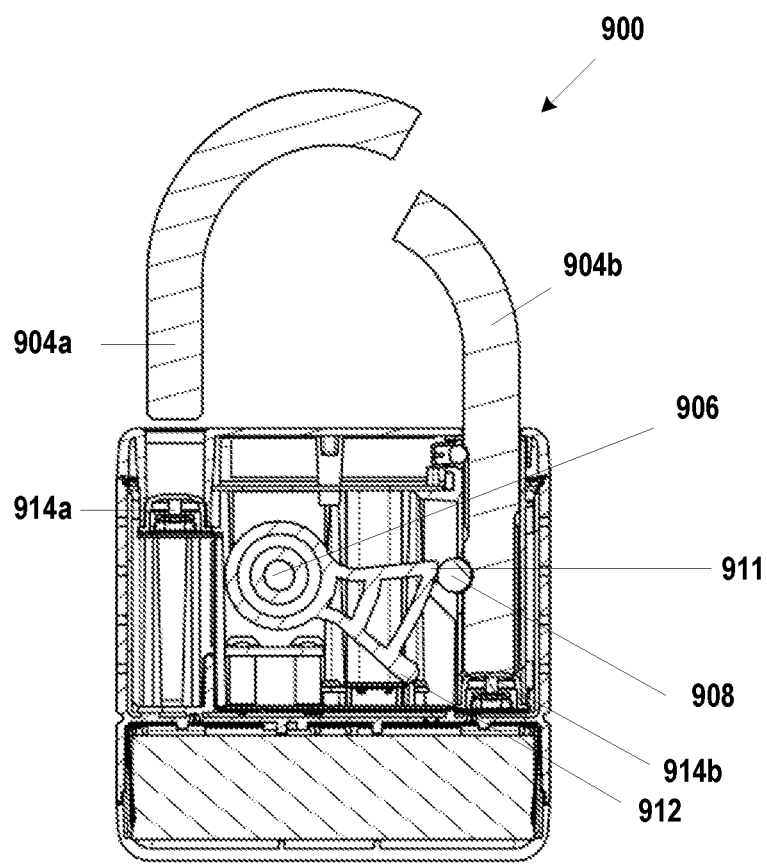
FIG. 13 is a cross-sectional view of the locking device of FIG. 9A along the line A-A in FIG. 9D, the cross-sectional view showing the locking device in an unlocked state with its locking pin in its open position and its shackle in its open position and cut, according to at least one embodiment.

Each of the detection switches 914 may be coupled (e.g. electrically coupled) to the locking processing unit of the lock 900 to provide a signal to the locking processing unit indicating a position of the shackle 903 (e.g. of the arms 904 of the shackle 903). The lock processing unit may determine a status of the shackle (e.g. as being either open or closed) based on the signal received from one or more of the detection switches 914. For example, in the embodiment shown in FIG. 13 where the shackle 903 has been cut, the first detection switch 914a indicates that arm 904a of the shackle 903 is in its open state and second detection switch 914b indicates that arm 904b of the shackle 903 is in its closed state. It should be noted that in this position, the locking pin 908 and the locking cam 906 are each still in their respective locked positions, however, the locking processing unit is able to determine the position of the shackle based on the signal received from one or more of the detection switches.

In at least one embodiment, the detection switches 914 are electromechanical switches, such as but not limited to KSC4D Series Sealed Detect Switches by C&K®.

Figure 14:
FIG. 14 is a switch status diagram showing the outcomes of various combinations of the switches shown in FIG. 13.
Figure 14:
Figure 14:

FIG. 14 shows three diagrams of potential configurations for a shackle detection switch circuit for providing the position of the shackle 903 to the locking processing unit can be configured in a number of different ways. Although FIG. 14 provides three possible configurations, it should be understood that other configurations are contemplated in the embodiments described herein and the embodiments described herein should not be limited by the configurations shown in FIG. 14.

For instance, as shown in FIG. 14, in at least one embodiment, the shackle detection switch circuit may include two switches connected in series. In this embodiment, if one of the switches is broken (e.g. changes state) the circuit switches its state.

In at least one embodiment, the shackle detection switch circuit may include a separate circuit for each switch of the locking device. In this embodiment, if one of the switches is broken, only the circuit concluding that switch will change state.

In at least one embodiment, the shackle detection switch circuit may include a single circuit with a single switch. In this embodiment, if the switch is broken, the circuit will change state.

Other mechanisms for providing the shackle detection switch circuit may include a light circuit through a light pipe running through the shackle. The light circuit may include a light emitting diode (LED), for example, at one end of the shackle and a detector positioned opposed to the end of the LED within the body 902 of the locking device 900. In this embodiment, if the shackle 903 is cut the LED will stop emitting light and the detector can detect the absence of light.

In at least one embodiment, the position of the LED and the detector may be reversed from that previously described. In this embodiment, the shackle 903 may include the electrical switch so that a connection at either end of the shackle 903 (e.g. metal shackle) will be broken by an open or cut event.

Figure 15B:
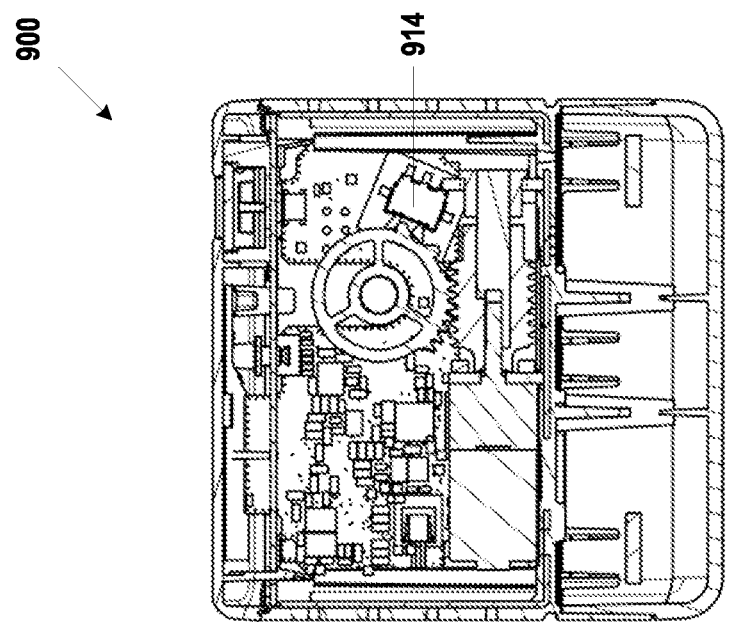
FIG. 15B is a cross-sectional view of the locking device of FIG. 15A showing the reversed view relative to the view shown in FIG. 15A.
Figure 15A:
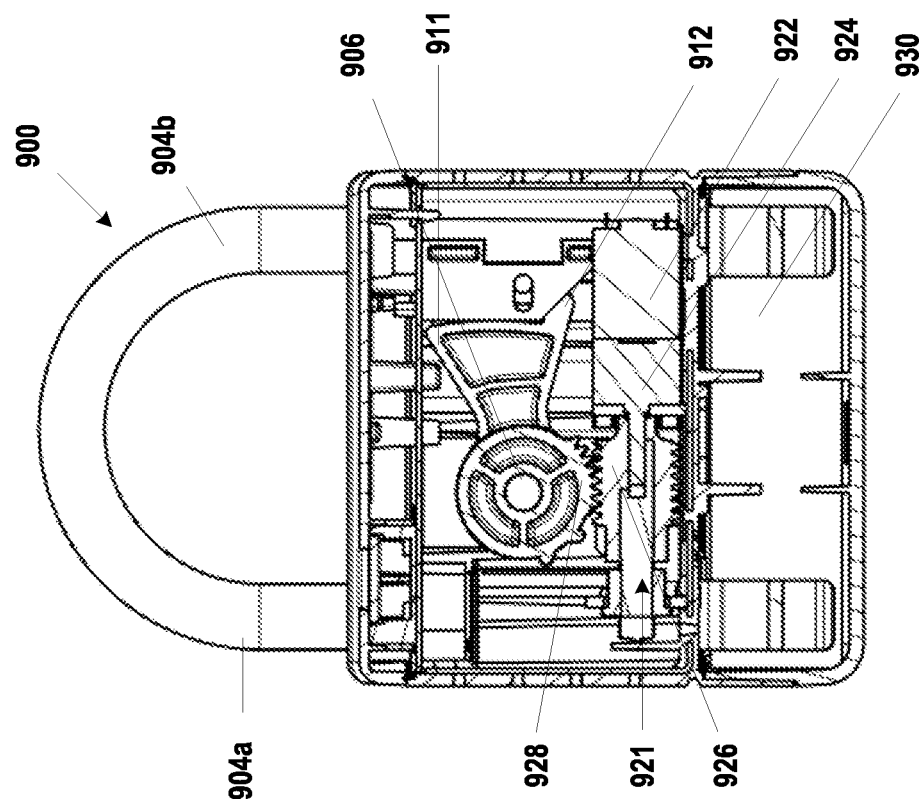
FIG. 15A is a cross-sectional view of a locking device according to another embodiment, the cross-sectional view showing the drive system of the locking device.

FIG. 15A is a cross-sectional view of another embodiment of the locking device 900 in a locked state with a front panel of the locking device 900 removed to show a drive system 921 of the locking device 900, according to at least one embodiment. Drive system 921 includes a motor 922, a gear box 924, a worm gear 926 a cam drive gear 928 and a control printed circuit board (PCB) 930. In at least one embodiment, the motor 922 and the cam drive gear 928 drive the locking cam 906 between the locked and unlocked positions. FIG. 15B is a reversed view of FIG. 15A showing the locking device 900 of FIG. 15A with a rear panel removed.

In this embodiment, a signal generated by the PCB 930 activates the motor 922 to rotate the rotatable locking cam 906. Activation of the motor 922 rotates the worm gear 926 via the gear box 924, which in turn rotates the cam drive gear 928 to rotate the rotatable locking cam 906. A subsequent signal from the PCB 930 can turn off the motor 922.

In at least one embodiment, the position of the rotatable cam 906 can be detected by for example but not limited to hall detect sensors and/or magnets.

For example, a Hall detect sensor (i.e. a transducer that varies its output voltage in response to a magnetic field) could be used to detects if locking device 900 is in an unlocked state by detecting if the rotatable locking cam 906 has rotated to a position where the locking pin 908 is disengaged with the groove 910. In these embodiments, a hall detect sensor could also detect if locking device 900 is in a locked state by detecting if the locking pin 908 is in a position where it is engaged with the groove 910. In another embodiment, a hall detect sensor could detects if locking device 900 is in a locked state by detecting if the rotatable locking cam 906 has rotated to a position where the locking pin 908 is engaged with the groove 910. In each of these embodiments, the one or more hall detect sensors may be mounted on the PCB.

In at least one embodiment, a position of the locking pin 908 can be detected based on the position of a biasing mechanism, such as but not limited to a spring. In at least one embodiment, a position of the locking pin 908 can be detected using one or more magnets that are configured to bias the locking pin 108, for example, either towards or away from the rotatable locking cam 906 and/or towards or away from the shackle 903.

In at least one embodiment, the position of one or more of the locking cam 906, the locking pin 908 and the shackle 903 may be used to determine whether the lock is in one or more of its locked, unlocked, open or closed states. In some embodiments, upon determining whether the lock is in one or more of its locked, unlocked, open or closed states, the locking device 900 may, together with the lock communication interface, may send an alert to a user (e.g. to a mobile device of the user via Bluetooth or the like) to indicate whether the lock is in one or more of its locked, unlocked, open or closed states. For instance, the locking device 900 may send an alert to a mobile device of a user as the user leaves the lock and walks away.

Figure 16B:
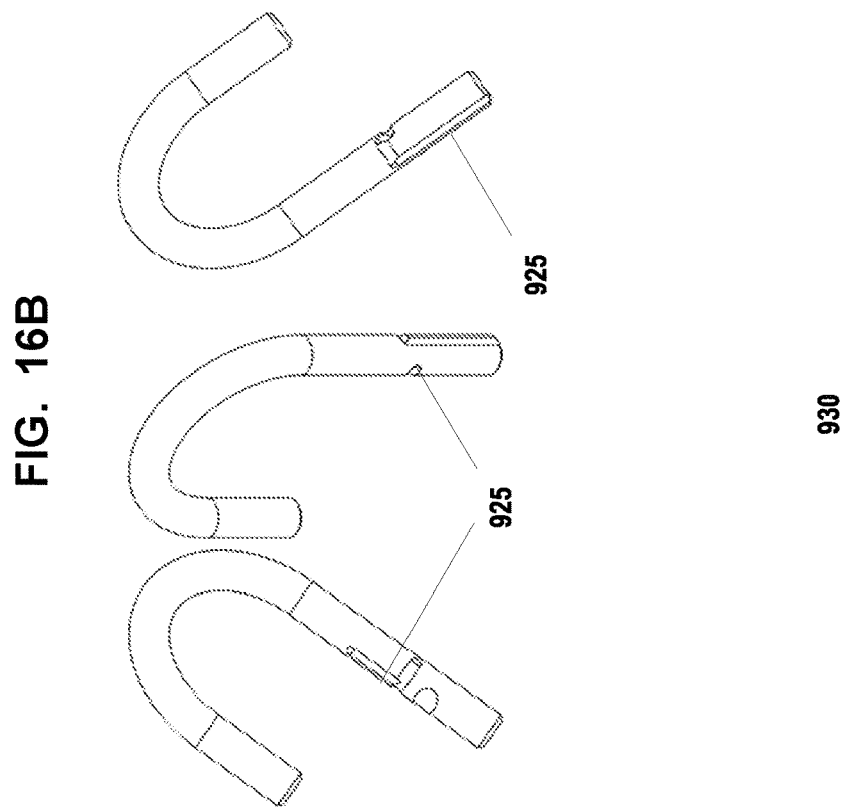
FIG. 16B is a collection of three perspective views of a shackle having a raceway of the locking device of FIG. 16A, according to one embodiment.
Figure 16A:
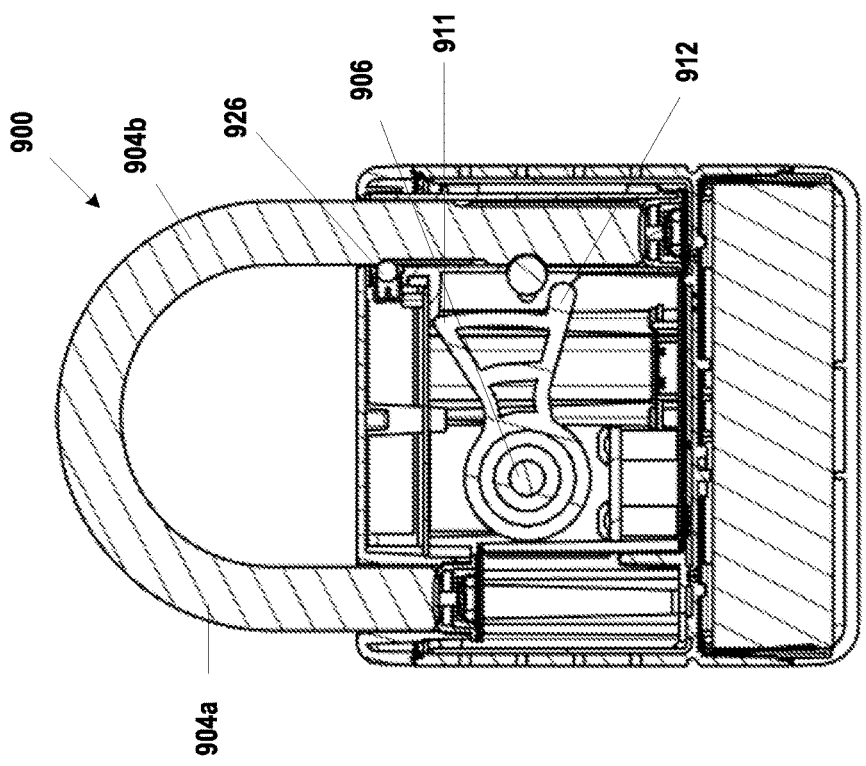
FIG. 16A is a cross-sectional view of a locking device according to another embodiment, the cross-sectional view showing a spring ball plunger of the locking device according to one embodiment.

FIG. 16A shows a cross-sectional view of another embodiment of locking device 900 having a shackle 903 having a locking pin groove 910 sized and shaped to receive a locking pin 908 of the locking device 900. In this embodiment, shackle 903 also includes a raceway 925 positioned above the locking pin groove 910. Raceway 925 is sized and shaped to engage with a spring ball plunger 926 of the locking device 900. As shown in FIG. 16A, in at least one embodiment, the spring ball plunger 926 is positioned upward relative to the locking cam 906 of the locking device 900 to engage with arm 904b of shackle 903.

Raceway 925, shown in greater detail in FIG. 16B, provides for a cut or damaged shackle 903 to be removed from the locking device 900. For instance, by rotating the shackle 903 when it is in its open position such that the spring ball plunger 926 follows the path of the raceway 925, and then pulling upwardly on the shackle 903 while depressing the plunger, the shackle 903 can be removed from the body 902 of the locking device 900 without having to open the structure (e.g. one or more panels) of the locking device 900. Further, by inserting a new shackle 903 into the recess of the body 902 adjacent to the spring ball plunger 926 such that the spring ball plunger 926 enters the raceway 925 of the shackle 903, a new shackle 903 can be installed in the reverse path without having to open the structure (e.g. one or more panels) of the locking device 900. Accordingly, raceway 925 provides for shackle 903 to translate upward and rotate about 90 degrees (in either direction) once the other end (e.g. arm 904*a*) is vertically translated upwardly by a distance to provide for it to clears the lock body 902 upon being rotated.

Raceway 925 may also work together with the one or more shackle detect switches 914 to close and lock the shackle 903. For instance, in at least one embodiment, shackle 903 needs to be positioned within the body 902 to provide for both switches 924 to be engaged. In one example, one might attempt to imitate that lock 900 is locked when it is not closed by unlocking and opening the locking device 900, then cutting the shackle 903 and reinserting the shackle 903 into the body 902 to close the switch while putting the lock 900 into its locked state. In this case, locking device 900 may detect that the switch has been released, detect a changed state of the locking device 900 and transmit a message (e.g. to the server).

Various embodiments have been described herein by way of example only. Various modification and variations may be made to these example embodiments without departing from the spirit and scope of the invention, which is limited only by the appended claims. Also, in the various user interfaces illustrated in the figures, it will be understood that the illustrated user interface text and controls are provided as examples only and are not meant to be limiting. Other suitable user interface elements may be possible.

We claim:

1. A system for controlling access to a secure space, the system comprising:
   at least one communication network;
   a locking device fastenable to an access point of the secure space, the locking device comprising an actuator, a lock processor, a lock memory, and at least one lock communication interface, the actuator for moving the locking device into a locked state to maintain the access point closed or an unlocked state to allow the access point to be opened, the lock processor operable to generate a control signal for the actuator, the at least one lock communication interface being operable to communicate via the at least one communication network; and
   a server comprising:
      a server memory to store cryptography data for the locking device;
      at least one server communication interface operable to communicate with the locking device and at least one user computing device via the at least one communication network; and
      a server processor operable to:
         receive, from a user computing device of the at least one user computing device, a request to access the locking device;
         authenticate the user computing device;
         in response to authenticating the user computing device, generate authorization data for the locking device and the authenticated user computing device, the authorization data comprising the cryptography data for the locking device and cryptography data for the authenticated user computing device; and
         provide at least part of the authorization data to each of the locking device and the authenticated user computing device;
   wherein the lock processor is operable to:
      store the authorization data from the server in the lock memory;
      detect user manipulation of the locking device;
      in response to user manipulation of the locking device, advertise identification data for the locking device;
      after advertising the identification data, receive a security command from the at least one user computing device;
      determine whether the security command comprises requesting data that corresponds to the authorization data stored in the lock memory; and
      in response to determining that the requesting data corresponds to the authorization data stored in the lock memory;
         generate a control signal for the actuator to move the locking device into the locked state when the locking device transitions from open to closed,
         otherwise generate a control signal for the actuator based at least in part on the security command.

2. The system of claim 1, wherein:
   the security command comprises either an unlock command or a lock command;
   upon receipt of an unlock command, the control signal generated by the lock processor comprises a signal to move the locking device into the unlocked state; and
   upon receipt of a lock command, the control signal generated by the lock processor comprises a signal to move the locking device into the locked state.

3. The system of claim 1, wherein the cryptography data for the lockinq device comprises a public key of a public/private key pair of the locking device, the private key pair of the locking device being stored in the lock memory.

4. The system of claim 1, wherein the cryptography data for the authenticated user computing device comprises a public key of a public/private key pair of the authenticated user computing device, the private key pair of the authenticated user computing device being stored in memory of the authenticated user computing device.

5. The system of claim 1, wherein the authorization data provided to the locking device and the authenticated user computing device comprises a digital access key including a pre-determined usage limit defining a number of instances that the digital access key can be reused; and the lock processor is operable to determine whether the digital access key is valid based on the pre-determined usage limit.

6. The system of claim 5, wherein the digital access key includes at least one of a pre-determined expiration date or a pre-determined expiration period; and the lock processor is operable to determine whether the digital access key is valid based on at least one of the pre-determined expiration date and the pre-determined expiration period.

7. The system of claim 1, wherein the authorization data comprises a digital access key including generation date of the digital access key; and the lock processor is operable to determine whether the Hall digital access key is valid based on the generation date of the digital access key.

8. The system of claim 1, wherein the authorization data comprises a digital access key signed using a certificate; and the lock processor is operable to determine whether the digital access key is valid based on the certificate used to sign the digital access key.

9. The system of claim 8, wherein the certificate is generated by a certificate authority of a plurality of sequential certificate authorities.

10. The system of claim 1, wherein the server processor operable to authenticate the user computing device comprises generating an invitation token having a pre-determined expiration period, sending the invitation token to the user computing device, and receiving the invitation token within the pre-determined expiration period.

11. A method for controlling access to a secure space, the method comprising:
providing at least one communication network and a server, the server comprising a server processor, a server memory, and at least one communication interface operable to communicate with at least one user computing device via the at least one communication network;
fastening a locking device to an access point of the secure space, the locking device comprising an actuator, a lock processor, a lock memory, and at least one lock communication interface, the actuator for moving the locking device into a locked state to maintain the access point closed or an unlocked state to allow the access point to be opened, the at least one lock communication interface being operable to communicate with the server via the at least one communication network;
storing cryptography data for the locking device on the server memory;
configuring the server processor to:
receive, from a user computing device of the at least one user computing device, a request to access the locking device;
authenticate the user computing device;
in response to authenticating the user computing device, generate authorization data for the locking device and the authenticated user computing device, the authorization data comprising the cryptography data for the locking device and cryptography data for the authenticated user computing device; and
provide at least part of the authorization data to each of the locking device and the authenticated user computing device; and
configuring the lock processor to:
store the authorization data from the server in the lock memory;
detect user manipulation of the locking device;
in response to user manipulation of the locking device, advertise identification data for the locking device;
after advertising the identification data, receive a security command from the at least one user computing device;
determine whether the security command comprises requesting data that corresponds to the authorization data stored in the lock memory; and
in response to determining that the requesting data corresponds to the authorization data stored in the lock memory;
generate a control signal for the actuator to move the locking device into the locked state when the locking device transitions from open to closed, otherwise generate a control signal for the actuator based at least in part on the security command.

12. The method of claim 11, wherein:
the security command comprises either an unlock command or a lock command; and
configuring the lock processor comprises configuring the lock processor to:
generate a signal to move the locking device into the unlocked state upon receipt of an unlock command; and
generate a signal to move the locking device into the locked state upon receipt of a lock command.

13. The method of claim 11, wherein the cryptography data for the locking device comprises a public key of a public/private key pair of the locking device, the private key pair of the locking device being stored in the lock memory.

14. The method of claim 11, wherein the cryptography data for the authenticated user computing device comprises a public key of a public/private key pair of the authenticated user computing device, the private key pair of the authenticated user computing device being stored in memory of the authenticated user computing device.

15. The method of claim 11, wherein the authorization data provided to the locking device and the authenticated user computing device comprises a digital access key including a pre-determined usage limit defining a number of instances that the digital access key can be reused; and the lock processor is operable to determine whether the digital access key is valid based on the pre-determined usage limit.

16. The method of claim 15, wherein the digital access key includes at least one of a pre-determined expiration date or a pre-determined expiration period; and the lock processor is operable to determine whether the digital access key is valid based on at least one of the pre-determined expiration date and the pre-determined expiration period.

17. The method of claim 11, wherein the authorization data comprises a digital access key including a generation date of the digital access key; and configuring the lock processor comprises configuring the lock processor to determine whether the digital access key is valid based on the generation date of the digital access key.

18. The method of claim 11, wherein the authorization data comprises a digital access key signed using a certificate; and configuring the lock processor comprises configuring the lock processor to determine whether the digital access key is valid based on the certificate used to sign the digital access key.

19. The method of claim 18, wherein the certificate is generated by a certificate authority of a plurality of sequential certificate authorities.

20. The method of claim 11, wherein configuring the server processor to authenticate the user computing device comprises configuring the server processor to generate an invitation token having a pre-determined expiration period, send the invitation token to the user computing device, and receive the invitation token within the pre-determined expiration period.

* * * * *

UNITED STATES PATENT AND TRADEMARK OFFICE
CERTIFICATE OF CORRECTION

| | | |
|---|---|---|
| PATENT NO. | : 11,568,693 B2 | Page 1 of 1 |
| APPLICATION NO. | : 17/385392 | |
| DATED | : January 31, 2023 | |
| INVENTOR(S) | : Jeanne Grzenda, Timothy Kyowski and Sean B. Simmons | |

It is certified that error appears in the above-identified patent and that said Letters Patent is hereby corrected as shown below:

In the Claims

Claim 3, Column 34, Line 29:
"the lockinq device"
Should read:
-- the locking device --

Claim 7, Column 34, Line 54:
"the Hall digital access key"
Should read:
-- the digital access key --

Signed and Sealed this
Twenty-first Day of January, 2025

Coke Morgan Stewart
*Acting Director of the United States Patent and Trademark Office*